United States Patent
Kageura et al.

(10) Patent No.: US 10,923,719 B2
(45) Date of Patent: Feb. 16, 2021

(54) POSITIVE-ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Jun-ichi Kageura, Niihama (JP); Ryota Kobayashi, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 0 days.

(21) Appl. No.: 16/645,778

(22) PCT Filed: Nov. 20, 2018

(86) PCT No.: PCT/JP2018/042817
§ 371 (c)(1),
(2) Date: Mar. 9, 2020

(87) PCT Pub. No.: WO2019/098384
PCT Pub. Date: May 23, 2019

(65) Prior Publication Data
US 2020/0274158 A1   Aug. 27, 2020

(30) Foreign Application Priority Data
Nov. 20, 2017   (JP) .................................. 2017-222627

(51) Int. Cl.
*H01M 4/525*   (2010.01)
*H01M 10/0525*   (2010.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS

2002/0053663 A1   5/2002   Ito et al.
2012/0282525 A1   11/2012  Nagai et al.
(Continued)

FOREIGN PATENT DOCUMENTS

CN   103249678 A   8/2013
CN   104136376 A   11/2014
(Continued)

OTHER PUBLICATIONS

International Search Report issued in corresponding International Patent Application No. PCT/JP2018/042817, dated Feb. 5, 2019, with English translation.
(Continued)

*Primary Examiner* — Tracy M Dove
(74) *Attorney, Agent, or Firm* — McDermott Will & Emery LLP

(57) ABSTRACT

A positive-electrode active material for a lithium secondary battery includes: a secondary particle in which a plurality of primary particles of a lithium composite metal oxide are aggregated, in which the secondary particle has a void formed therein, and a through-hole that connects the void to a surface of the secondary particle, and satisfies predetermined requirements (i) to (iii).

6 Claims, 4 Drawing Sheets

(51) Int. Cl.
*C01G 53/00* (2006.01)
*H01M 4/505* (2010.01)
*H01M 4/02* (2006.01)

(52) U.S. Cl.
CPC ..... *H01M 10/0525* (2013.01); *C01P 2006/12* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2014/0011090 A1 | 1/2014 | Toya et al. | |
| 2014/0050976 A1 | 2/2014 | Nagai | |
| 2014/0377660 A1 | 12/2014 | Fukui et al. | |
| 2015/0140389 A1 | 5/2015 | Nagai et al. | |
| 2015/0188183 A1 | 7/2015 | Nagai et al. | |
| 2015/0325838 A1 | 11/2015 | Tamaki et al. | |
| 2016/0036041 A1 | 2/2016 | Uwai et al. | |
| 2018/0159127 A1 | 6/2018 | Kurita et al. | |

FOREIGN PATENT DOCUMENTS

| | | |
|---|---|---|
| CN | 104380499 A | 2/2015 |
| CN | 104584268 A | 4/2015 |
| JP | 2002-075365 A | 3/2002 |
| JP | 2002-201028 A | 7/2002 |
| JP | 2004-253174 A | 9/2004 |
| JP | 2011-119092 A | 6/2011 |
| JP | 5175826 B2 | 4/2013 |
| JP | 2013-144625 A | 7/2013 |
| JP | 2013-147416 A | 8/2013 |
| JP | 2014-011064 A | 1/2014 |
| JP | 2014-067546 A | 4/2014 |
| JP | 2015-076397 A | 4/2015 |
| JP | 2015-140297 A | 8/2015 |
| JP | 2016-031854 A | 3/2016 |
| WO | 2012/153379 A1 | 11/2012 |
| WO | 2014/142279 A1 | 9/2014 |
| WO | 2016/129361 A1 | 8/2016 |
| WO | 2016/195036 A1 | 12/2016 |

OTHER PUBLICATIONS

Japanese Notice of Reasons for Refusal issued in corresponding Japanese Patent Application No. 2017-222627, dated Aug. 14, 2018, with English translation.

Japanese Opposition filed in corresponding Japanese Patent Application No. 2017-222627, dated Oct. 31, 2019.

Japanese Notice of Reason for Cancellation issued in corresponding Japanese Patent Application No. 2017-222627, dated Dec. 24, 2019.

Japanese Decision to Grant Patent issued in corresponding Japanese Patent Application No. 2017-222627, dated Jan. 25, 2019, with English translation.

Korean Notification of Reason for Refusal issued in corresponding to Korean Patent Application No. 10-2020-7003484, dated Mar. 27, 2020, with English translation.

Japanese Decision on Opposition issued in corresponding Japanese Patent Application No. 2017-222627, dated Apr. 1, 2020, with partial English translation.

Chinese Office Action issued in corresponding Chinese Patent Application No. 201880050929.1, dated Jul. 21, 2020, with English translation.

POSITIVE-ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

CROSS REFERENCE TO RELATED APPLICATIONS

This application is the U.S. National Phase under 35 U.S.C. 371 of International Application No. PCT/JP2018/042817, filed on Nov. 20, 2018, which claims the benefit of Japanese Application No. 2017-222627, filed on Nov. 20, 2017, the entire contents of each are hereby incorporated by reference.

TECHNICAL FIELD

The present invention relates to a positive-electrode active material for a lithium secondary battery, a positive electrode for a lithium secondary battery, and a lithium secondary battery.

Priority is claimed on Japanese Patent Application No. 2017-222627, filed on Nov. 20, 2017, the content of which is incorporated herein by reference.

BACKGROUND ART

A lithium composite metal oxide has been used as a positive-electrode active material for a lithium secondary battery. Lithium secondary batteries have been already in practical use not only for small power sources in mobile phone applications, notebook personal computer applications, and the like but also for medium-sized and large-sized power sources in automotive applications, power storage applications, and the like.

In order to further expand the applications of lithium secondary batteries, lithium secondary batteries with improved battery characteristics are required. For example, in PTL 1, an active material particle for a lithium secondary battery is described in which a secondary particle formed by aggregating a plurality of primary particles of a lithium transition metal oxide has a hollow structure having a hollow portion inside and a through-hole is formed from the outside to the inside of the secondary particle, for the purpose of suppressing deterioration of battery characteristics particularly in a charge/discharge cycle with high-rate discharge.

PRIOR ART LITERATURE

Patent Documents

[PTL 1] Japanese Unexamined Patent Application, First Publication No. 2011-119092

SUMMARY OF THE INVENTION

Problems to be Solved by the Invention

However, there is room for further improvement in the positive-electrode active material obtained by the method described in PTL 1 in order to further improve the rate characteristics of the lithium secondary battery.

The present invention has been made in view of the above circumstances, and an object thereof is to provide a positive-electrode active material for a lithium secondary battery excellent in rate characteristics, a positive electrode for a lithium secondary battery using the positive-electrode active material for a lithium secondary battery, and a lithium secondary battery.

Means for Solving the Problems

That is, the present invention includes the inventions of the following [1] to [8].

[1] A positive-electrode active material for a lithium secondary battery, including: a secondary particle in which a plurality of primary particles of a lithium composite metal oxide are aggregated, in which the secondary particle has a void formed therein and a through-hole that connects the void to a surface of the secondary particle, and the positive-electrode active material for a lithium secondary battery satisfies all of the following (i) to (iii):

(i) in a cross section of the secondary particle, a ratio (B/A) of a minor axis length B of a figure surrounded by an outer edge of the cross section to a major axis length A of the figure is 0.75 or more and 1.0 or less, (ii) a proportion of a total area of the void exposed in the cross section to an area of the figure is 2.0% or more and 40% or less, and (iii) a proportion of an area of the void present in a center portion of the secondary particle among the void exposed in the cross section to the total area of the void exposed in the cross section is 60% or more and 99% or less. Here, the major axis length is the longest diameter among diameters of the figure passing through a position of center of mass of the figure in the figure, and the minor axis length is the shortest diameter among the diameters of the figure passing through the position of center of mass of the figure in the figure.

When a circle having a radius of r calculated by the following formula in which the area of the figure is S and the position of center of mass of the figure is a center is assumed, the center portion is a portion surrounded by the circle.

$r=(S/\pi)^{0.5}/2$

[2] The positive-electrode active material for a lithium secondary battery according to [1], in which a void fraction in the center portion of the secondary particle is 15% or more and 50% or less.

[3] The positive-electrode active material for a lithium secondary battery according to [1] or [2], in which a void fraction in the surface portion of the secondary particle is 0.10% or more and 10% or less when the surface portion is a portion excluding the center portion in the figure.

[4] The positive-electrode active material for a lithium secondary battery according to any one of [1] to [3], in which the positive-electrode active material has a pore peak at a pore radius of 30 nm or more and 150 nm or less in a pore distribution measurement by a mercury intrusion method.

[5] The positive-electrode active material for a lithium secondary battery according to any one of [1] to [4], in which a BET specific surface area of the secondary particles is 0.2 m²/g or more and 3.0 m²/g or less.

[6] The positive-electrode active material for a lithium secondary battery according to any one of [1] to [5], in which a composition formula of the lithium composite metal oxide is represented by Formula (I),

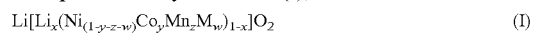

(in Formula (I), 0≤x≤0.2, 0<y≤0.4, 0≤z≤0.4, 0≤w≤0.1, and M is one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn).

[7] A positive electrode for a lithium secondary battery, including: the positive-electrode active material for a lithium secondary battery according to any one of [1] to [6].

[8] A lithium secondary battery including: the positive electrode for a lithium secondary battery according to [7].

Advantageous Effects of Invention

According to the present invention, it is possible to provide a positive-electrode active material for a lithium secondary battery excellent in rate characteristics, a positive electrode for a lithium secondary battery using the positive-electrode active material for a lithium secondary battery, and a lithium secondary battery.

EMBODIMENT MODE FOR CARRYING OUT THE INVENTION

Figure 1A:
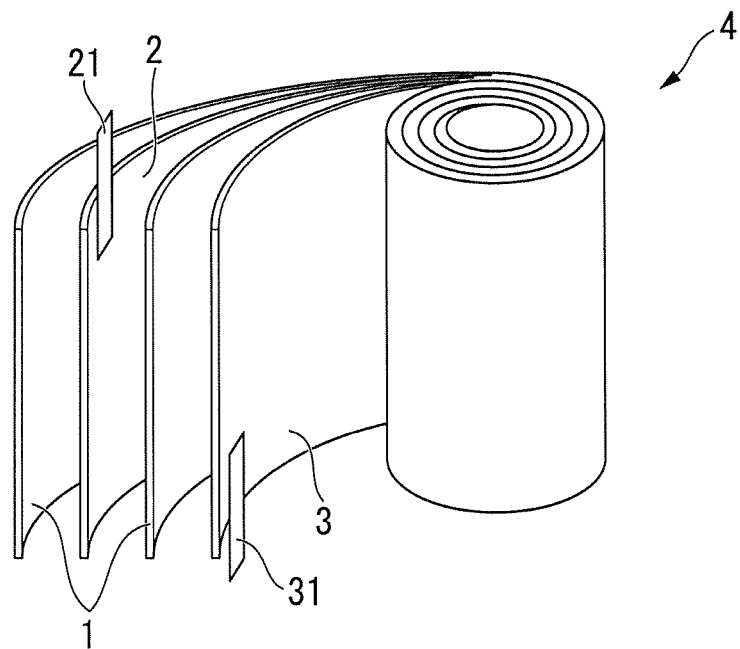
FIG. 1A is a schematic configuration view illustrating an example of a lithium-ion secondary battery.

<Positive-Electrode Active Material for Lithium Secondary Battery>

The present invention is a positive-electrode active material for a lithium secondary battery which includes a secondary particle in which a plurality of primary particles of a lithium composite metal oxide are aggregated, in which the secondary particle has a void formed therein, and a through-hole that connects the void to a surface of the secondary particle, and the positive-electrode active material for a lithium secondary battery satisfies all of the following (i) to (iii):

(i) in a cross section of the secondary particle, a ratio (B/A) of a minor axis length B of a figure surrounded by an outer edge of the cross section to a major axis length A of the figure is 0.75 or more and 1.0 or less, (ii) a proportion of a total area of the void exposed in the cross section to an area of the figure is 2.0% or more and 40% or less, and (iii) a proportion of an area of the void present in a center portion of the secondary particle among the void exposed in the cross section to the total area of the void exposed in the cross section is 60% or more and 99% or less, «Measurement Method of Cross-Sectional Structure of Secondary Particle»

In the present embodiment, a measurement method of the cross-sectional structure of a secondary particle of the positive-electrode active material will be described below.

First, the positive-electrode active material is processed to obtain a cross section. As a method of obtaining the cross section, there is a method of obtaining a cross section of a secondary particle by processing the positive-electrode active material with a focused ion beam processing apparatus. Alternatively, a part of a positive electrode produced using the positive-electrode active material may be cut out and processed with an ion milling apparatus to obtain a cross section of the positive-electrode active material included in an electrode mixture layer. Here, as samples to be subjected to cross-section processing, positive-electrode active materials in which a maximum diameter is 50% cumulative volume particle size D50 ($\mu$m)±5% obtained by laser diffraction particle size distribution measurement are selected and processed to pass through the vicinity of the center of mass of the positive-electrode active material particles, and several tens to several hundreds of those in which the major axis length of the cross section of the secondary particle is D50 ($\mu$m)±5% are selected and observed. As an example, 20 samples in which the major axis length of the cross section of the secondary particle is D50 ($\mu$m)±5% are selected and observed.

As the sample to be subjected to cross-section processing, not only a positive-electrode active material powder and an electrode but also one obtained by solidifying the positive-electrode active material powder with a resin can be appropriately selected. Furthermore, as a method of producing the cross section, not only an ion beam method but also polishing or the like can be selected as appropriate.

Next, using a scanning electron microscope or a focused ion beam processing apparatus, the cross section of the positive-electrode active material obtained by the above processing is observed with a secondary electron image.

The cross-sectional image is taken into a computer, and binarization is performed with an intermediate value between the maximum luminance and the minimum luminance in the secondary particle image using image analysis software, thereby obtaining a binarized image in which the inside of the cross section of the secondary particle is converted into black and a void part present inside the cross section of the secondary particle is converted into white. At this time, the cross-sectional image is visually observed to confirm that there is no deviation between the inside of the cross section and the void part. In a case where a deviation is seen, a threshold with which the binarization is performed is adjusted. Specifically, in a case where a point that can be clearly determined as a void portion when the cross-sectional image is visually observed is not converted into white after the binarization, the threshold with which the binarization is performed is adjusted. In addition, the void present inside the cross section is set to have an area of 0.01 $\mu$m$^2$ or more, and a void having an area of less than 0.01 $\mu$m$^2$ is regarded as being not present. As the image analysis software, Image J, Photoshop, or the like can be selected as appropriate.

In the present specification, in the figure surrounded by the outer edge of the cross section of the secondary particle selected as described above, the "major axis length" is the longest diameter among the diameters of the figure passing through the position of center of mass of the figure.

In the present specification, in the figure surrounded by the outer edge of the cross section of the cross section of the secondary particle selected as described above, the "minor axis length" is the shortest diameter among the diameters of the figure passing through the position of center of mass of the figure.

In the present specification, in the figure surrounded by the outer edge of the cross section of the secondary particle selected as described above, when a circle having a radius of r calculated by the following formula in which the area of the figure is S and the position of center of mass of the figure is a center is assumed, the "center portion" is a portion surrounded by the circle.

$$r=(S/\pi)^{0.5}/2$$

In the present specification, the "surface portion" is a portion excluding the center portion in the cross section of the secondary particle selected as described above. In addition, the center portion means the portion surrounded by the circle having the radius r that is ½ of the radius of the circle having an area equal to the area S of the figure. That is, the radius r of the center portion is calculated from the following calculation formula.

$$S=\pi(2r)^2$$

(i)

The positive-electrode active material for a lithium secondary battery of the present invention includes the secondary particle in which the plurality of primary particles of the lithium composite metal oxide are aggregated. Furthermore, in the cross section of the secondary particle, the ratio (B/A) of a minor axis length B of a figure surrounded by an outer edge of the cross section to a major axis length A of the figure is 0.75 or more and 1.0 or less.

Figure 4:
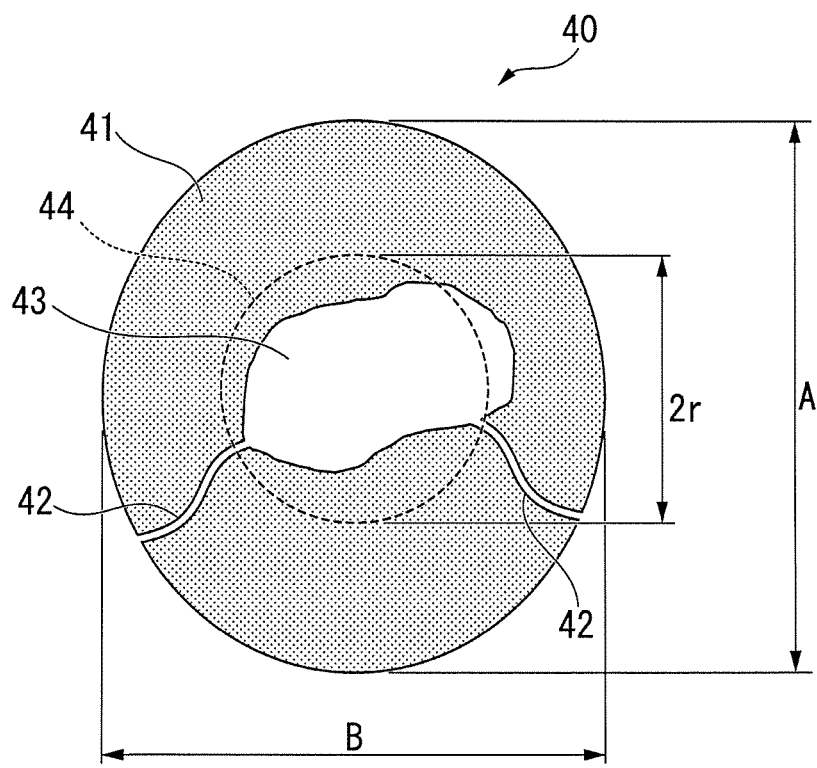
FIG. 4 is a schematic view of a cross section of a secondary particle of the positive-electrode active material for a lithium secondary battery of the present invention.

FIG. 4 is a schematic view of the cross section of the positive-electrode active material for a lithium secondary battery of the present embodiment. When the cross section of a secondary particle 40 is observed, the positive-electrode active material for a lithium secondary battery of the present embodiment has a void 43 in a center portion 44 of the secondary particle. The void 43 communicates with the outside of the secondary particle through a through-hole 42. That is, the secondary particle 40 has a substantially spherical shape, and has a void portion therein. The through-hole 42 connects the void portion to the surface of the secondary particle 40. The shape of the void 43 and the shape and number of through-holes 42 illustrated in FIG. 4 are merely examples, and are not limited thereto. Moreover, although the through-hole 42 is present in the cross section of the secondary particle 40 for convenience, there are cases where the through-hole 42 does not appear in the cross section of the secondary particle 40.

In the cross section of the secondary particle illustrated in FIG. 4, a region surrounded by the broken line is the center portion 44, and a portion closer to the particle surface side than the center portion 44 in the secondary particle (that is, a region closer to the outside than the center portion 44 in the figure) is a surface portion 41. When a circle having a radius r calculated by the following equation is assumed, the center portion 44 is an inner portion of a circle surrounded by the circle (that is, a circle having a diameter of 2r).

$$r=(S/\pi)^{0.5}/2$$

The ratio (B/A) of the minor axis length B to the major axis length A illustrated in FIG. 4 represents the sphericity of the secondary particle.

The closer the value of B/A is to 1, the closer the figure is to a circle. That is, it can be said that the secondary particles approach a true spherical shape. The lower limit of B/A is preferably 0.78 or more, more preferably 0.80 or more, and particularly preferably 0.85 or more. When B/A is in the above range, secondary particles with high true sphericity are obtained. Therefore, fillability when an electrode is manufactured is improved.

A scanning electron microscope image can be used for the measurement of B/A. B/A can be obtained by observing several tens to several hundreds of particles as samples, calculating the ratio (B/A) of the minor axis length B to the major axis length A, and obtaining the average value thereof. As an example, the number of samples is 20.

(ii)

In the positive-electrode active material for a lithium secondary battery of the present embodiment, the proportion of the total area of the void exposed in the cross section to the area of the figure (hereinafter, sometimes referred to as the void fraction of the entire cross section of the secondary particle) is 2.0% or more, preferably 4.0% or more, more preferably 5.0% or more, and particularly preferably 6.0% or more. In addition, the proportion is 40% or less, preferably 30% or less, more preferably 25% or less, and particularly preferably 20% or less.

The upper limit and the lower limit thereof can be randomly combined. For example, the void fraction of the entire cross section of the secondary particle is 2.0% or more and 40% or less, preferably 4.0% or more and 30% or less, more preferably 5.0% or more and 25% or less, even more preferably 2.0% or more and 20% or less, and particularly preferably 6.0% or more and 20% or less.

Here, "the void exposed in the cross section" means a void present in the cross section.

The void fraction of the entire cross section of the secondary particle is an average value of all the cross-section samples selected as described above.

(iii)

In the positive-electrode active material for a lithium secondary battery of the present embodiment, the proportion of the area of the void present in the center portion of the secondary particle among the void exposed in the cross section to the total area of the void exposed in the cross section is 60% or more, preferably 70% or more, more preferably 80% or more, and particularly preferably 90% or more. In addition, the proportion is 99% or less, preferably 98.5% or less, and more preferably 98% or less. When the proportion of the area of the void present in the center portion of the secondary particle among the void exposed in the cross section to the total area of the void exposed in the cross section is in the above range, an appropriate amount of electrolytic solution can be retained in the void inside the secondary particle. By using such a positive-electrode active material for a lithium secondary battery, the rate characteristics of the lithium secondary battery are improved.

The upper limit and the lower limit thereof can be randomly combined. For example, the proportion of the area of the void present in the center portion of the secondary particle among the void exposed in the cross section is 60% or more and 99% or less, preferably 70% or more and 98.5% or less, more preferably 80% or more and 98% or less, and particularly preferably 90% or more and 98% or less.

The proportion of the area of the void present in the center portion of the secondary particle among the void exposed in the cross section is an average value of all the cross-section samples selected as described above.

[Through-Hole]

The secondary particle included in the positive-electrode active material for a lithium secondary battery of the present embodiment has the void 43 formed therein, and the through-hole 42 that connects the void to the surface of the secondary particle. The opening width of the through-hole 42 is not particularly limited, and is preferably 30 nm or more and 150 nm or less. In the positive-electrode active material for a lithium secondary battery of the present embodiment, the electrolytic solution can infiltrate into the void portion inside the secondary particle from the outside through the through-hole. Accordingly, the rate characteristics of the lithium secondary battery are improved.

As one aspect, the through-hole can be included in a void portion present in the surface portion.

[Void Fraction in Center Portion of Secondary Particle]

In the positive-electrode active material for a lithium secondary battery of the present embodiment, the void fraction in the center portion of the secondary particle is 15% or more, preferably 20% or more, more preferably 23% or more, and particularly preferably 25% or more. In addition, the void fraction in the center portion of the secondary particle is 50% or less, preferably 45% or less, more preferably 40% or less, and particularly preferably 35% or less. By causing the void fraction in the center portion of the secondary particle to be in the above range, stress due to expansion and contraction of the primary particles caused by charging and discharging reactions is relieved, and a decrease in electron conduction due to generation of cracks inside the secondary particle can be suppressed.

The void fraction in the center portion of the secondary particle is calculated as follows from the cross-sectional observation results of the secondary particle obtained by the above-described measurement method of the cross-sectional structure of a secondary particle.

Void fraction (%) in the center portion of the secondary particle=area of the void part present in the center portion of the cross section of the secondary particle/area of the cross section of the secondary particle in the center portion of the secondary particle×100

The upper limit and the lower limit thereof can be randomly combined. For example, the void fraction in the center portion of the secondary particle is 15% or more and 50% or less, preferably 20% or more and 45% or less, more preferably 23% or more and 40% or less, even more preferably 20% or more and 40% or less, and particularly preferably 25% or more and 35% or less.

The void fraction in the center portion of the secondary particle is an average value of all the cross-section samples selected as described above.

[Void Fraction in Surface Portion of Secondary Particle]

In the positive-electrode active material for a lithium secondary battery of the present embodiment, the void fraction in the surface portion of the secondary particle is 0.1% or more, preferably 0.3% or more, and more preferably 0.5% or more. In addition, the void fraction in the surface portion of the secondary particle is 10% or less, preferably 5% or less, and more preferably 3% or less. By causing the void fraction in the surface portion of the secondary particle to be in the above range, generation of fine powder due to particle crushing during electrode pressing can be suppressed.

The void fraction in the surface portion of the secondary particle is calculated as follows from the cross-sectional observation results of the secondary particle obtained by the above-described measurement method of the cross-sectional structure of a secondary particle.

Void fraction (%) in the surface portion of the secondary particle=(area of the void part present in the surface portion of the cross section of the secondary particle/area of the cross section of the secondary particle in the surface portion of the secondary particle)×100

The upper limit and the lower limit thereof can be randomly combined. For example, the void fraction in the surface portion of the secondary particle is 0.1% or more and 10% or less, preferably 0.1% or more and 5% or less, more preferably 0.1% or more and 3% or less, and even more preferably 0.5% or more and 3% or less.

The void fraction in the surface portion of the secondary particle is an average value of all the cross-section samples selected as described above.

Figure 5:
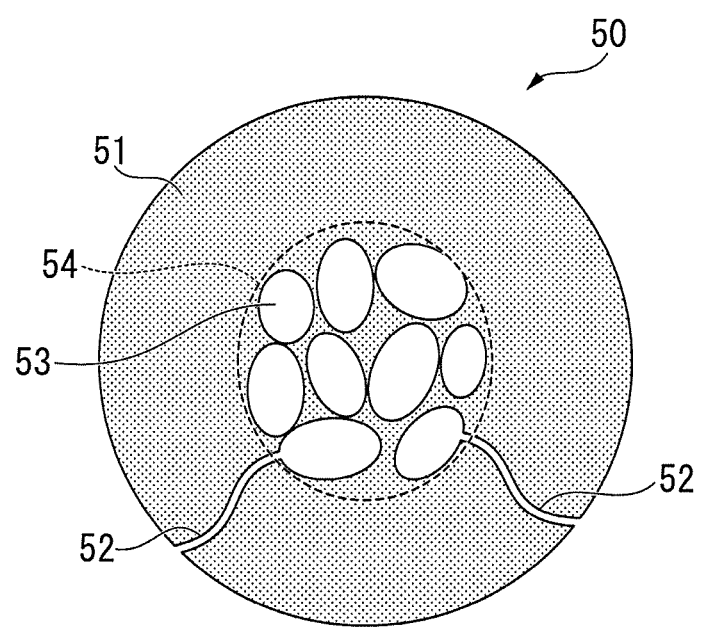
FIG. 5 is a schematic view of a cross section of a secondary particle of the positive-electrode active material for a lithium secondary battery of the present invention.

As illustrated in FIG. 4, the positive-electrode active material for a lithium secondary battery of the present embodiment has the void 43 in the center portion 44 of the secondary particle 40. As another embodiment, as illustrated in FIG. 5, a center portion 54 of a secondary particle 50 may have a void 53 having a porous structure. The void 53 having a porous structure means a structure in which a plurality of voids are present adjacent to each other. The plurality of voids may be partly connected to each other, or may be present independently without being connected to each other. However, since it is preferable that lithium ions be diffused throughout the secondary particle, it is preferable that some of the voids be connected to each other. The void 53 having a porous structure communicates with the outside of the secondary particle through through-holes 52. It is not necessary that all the voids 53 having a porous structure communicate with the secondary particle and the outside through the through-holes 52. For example, it is preferable that voids corresponding to 50% to 95% of the total area of voids present in the center portion of the secondary particle communicate with the outside of the secondary particle through the through-holes 52.

Also in this embodiment, the surface portion 51 of the secondary particle 50 preferably has few voids.

Figure 3A:
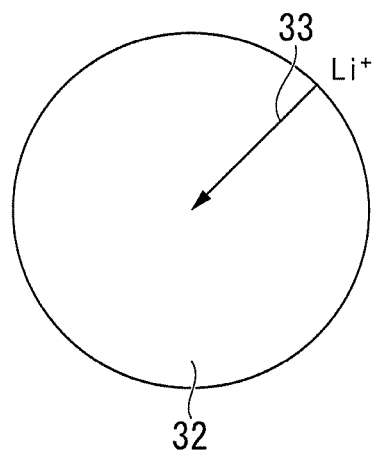
FIG. 3A is a schematic view of a cross section of a secondary particle of a positive-electrode active material for a lithium secondary battery to which the present invention is not applied.

In the case where the present invention is not applied and there is no void inside the secondary particle, considering that lithium ions are diffused throughout a secondary particle 32 illustrated in FIG. 3A, it is necessary to diffuse lithium ions from the surface of the secondary particle 32 to the vicinity of the center.

Figure 2A:
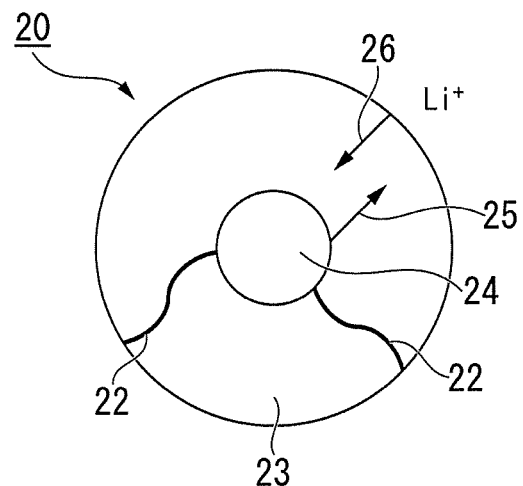
FIG. 2A is a schematic view of a cross section of a secondary particle of a positive-electrode active material for a lithium secondary battery of the present invention.

As illustrated in FIG. 2A, the positive-electrode active material for a lithium secondary battery according to the present embodiment has a void 24 in the center portion of a secondary particle 20. Therefore, as indicated by reference numerals 25 and 26 in FIG. 2A, the diffusion distance of lithium ions in the secondary particle is shorter than the distance indicated by reference numeral 33 in FIG. 3A.

For this reason, it can be presumed that the rate characteristics of the lithium secondary battery can be improved. Moreover, by providing through-holes 22, an electrolytic solution can easily infiltrate into the void portion from the outside. Therefore, the inside of the positive-electrode active material can be utilized effectively, and the rate characteristics of a lithium secondary battery can be improved.

In addition, when a surface portion 23 of the secondary particle 20 also has a void, the particle is crushed during electrode pressing, and this may cause the generation of fine powder. On the other hand, in the present embodiment, since the void fraction of the surface portion 23 of the secondary particle 20 is low and the void fraction of the center portion of the secondary particle 20 is high, there is also an effect that fine powder due to crushing is hardly generated.

Figure 2B:
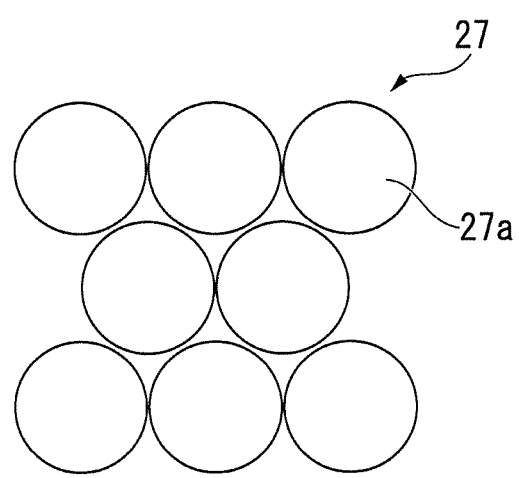
FIG. 2B is a schematic view describing fillability of the positive-electrode active material for a lithium secondary battery of the present invention.

A state in which the positive-electrode active material for a lithium secondary battery of the present embodiment is filled is indicated by reference numeral 27 in FIG. 2B. Since the secondary particle of the lithium composite metal oxide of the present embodiment has a high true sphericity, secondary particles 27a of the lithium composite metal oxide can be filled with good fillability. That is, by using the secondary particle of the lithium composite metal oxide having a high true sphericity as the positive-electrode active material for a lithium secondary battery of the present embodiment, the electrode density of a positive electrode for a lithium secondary battery is improved.

Figure 3B:
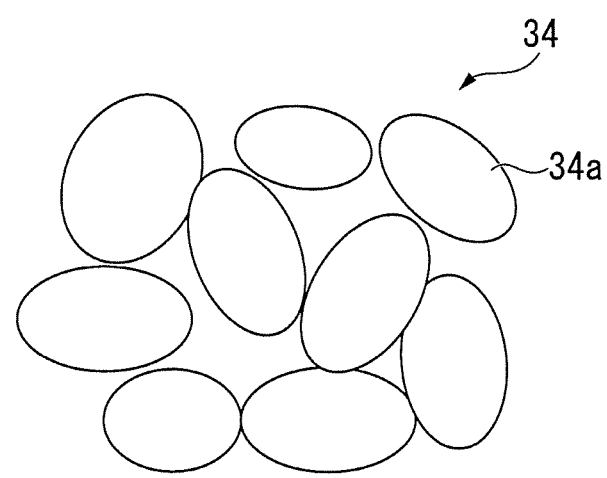
FIG. 3B is a schematic diagram describing fillability of the positive-electrode active material for a lithium secondary battery to which the present invention is not applied.

Contrary to this, a state in which secondary particles of a lithium composite metal oxide having a low true sphericity, to which the present invention is not applied, are filled is indicated by reference numeral 34 in FIG. 3B. When secondary particles 34a of the lithium composite metal oxide having a low true sphericity are used, the fillability is deteriorated. That is, when secondary particles of the lithium composite metal oxide having a low true sphericity are used as the positive-electrode active material for a lithium secondary battery, the electrode density of a positive electrode for a lithium secondary battery is lowered.

[Pore Peak]

The positive-electrode active material for a lithium secondary battery of the present embodiment preferably has a pore peak at a pore radius of 30 nm or more and 150 nm or less in a pore distribution measurement by a mercury intrusion method. In the present embodiment, the pore peak means the opening width of the through-hole that connects the void to the surface of the secondary particle.

Pore Distribution Measurement by Mercury Intrusion Method

In the present embodiment, the pore distribution measurement by the mercury intrusion method is performed by the following method.

First, the inside of a container containing the positive-electrode active material for a lithium secondary battery is evacuated to a vacuum and the container is filled with mercury. Mercury has a high surface tension, and as it is, mercury does not intrude into the pores on the surface of the positive-electrode active material for a lithium secondary battery. However, when pressure is applied to mercury and the pressure is gradually increased, mercury gradually intrudes the pores in order from the pores with large diameters to the pores with small diameter. When the amount of mercury intruding into the pores is detected while continuously increasing the pressure, a mercury intrusion curve can be obtained from the relationship between the pressure applied to mercury and the amount of mercury intruding.

Here, assuming that the shape of the pore is cylindrical, when the pressure applied to mercury is referred to as P, the pore diameter thereof (pore diameter) is referred to as D, the surface tension of mercury is referred to as σ, and the contact angle between mercury and the sample is referred to as 0, the pore diameter is represented by the Formula (A).

$$D = -4\sigma \times \cos\theta / P \quad (A)$$

That is, since there is a correlation between the pressure P applied to mercury and the diameter D of the pore into which mercury intrudes, based on the obtained mercury intrusion curve, a pore distribution curve representing the relationship between the size of the pore radius of the positive-electrode active material for a lithium secondary battery and the volume thereof can be obtained. When the length of the pore having the pore diameter D is referred to as L, the volume V is represented by Formula (B).

$$V = \pi D^2 L / 4 \quad (B)$$

Since the side area of the cylinder is S=πDL, S can be expressed as S=4V/D. Here, assuming that the volume increment dV in a certain pore diameter range is caused by a cylindrical pore having a certain average pore diameter, the specific surface area increased in that section can be obtained as dA=4 dV/Dav (Dav is the average pore diameter), and the pore specific surface area ΣA is calculated. In addition, as for the approximate measurement limit of the pore diameter by the mercury intrusion method, the lower limit is about 2 nm and the upper limit is about 200 μm. Measurement by the mercury intrusion method can be performed using an apparatus such as a mercury porosimeter. Specific examples of the mercury porosimeter include AutoPore III 9420 (manufactured by Micromeritics Instrument Corporation).

[BET Specific Surface Area]

In the present specification, the "specific surface area" is a value measured by the BET (Brunauer, Emmet, Teller) method.

In the present embodiment, the BET specific surface area (m²/g) of the secondary particles of the lithium composite metal oxide is 3.0 m²/g or less, preferably 2.7 m²/g or less, more preferably 2.5 m²/g or less, and particularly preferably 2.2 m²/g or less. The lower limit thereof is not particularly limited, and for example, is 0.2 m²/g or more, preferably 0.4 m²/g or more, more preferably 0.6 m²/g or more, and even more preferably 0.8 m²/g or more.

The upper limit and the lower limit of the BET specific surface area (m²/g) of the positive-electrode active material for a lithium secondary battery can be randomly combined. For example, the BET specific surface area (m²/g) of the positive-electrode active material for a lithium secondary battery is 0.2 m²/g or more and 3.0 m²/g or less, preferably 0.4 m²/g or more and 2.7 m²/g or less, more preferably 0.6 m²/g or more and 2.5 m²/g or less, and particularly preferably 0.8 m²/g or more and 2.2 m²/g or less.

In the measurement of the BET specific surface area, nitrogen gas is used as an adsorption gas. For example, the BET specific surface area is a value obtained by drying 1 g of a powder of a measurement object in a nitrogen atmosphere at 105° C. for 30 minutes, and measuring the powder using a BET specific surface area meter (for example, Macsorb (registered trademark) manufactured by MOUNTECH Co., Ltd.).

[Composition Formula]

The composition formula of the lithium composite metal oxide of the present embodiment is preferably represented by Formula (I)

$$\text{Li}[\text{Li}_x(\text{Ni}_{(1-y-z-w)}\text{Co}_y\text{Mn}_z\text{M}_w)]\text{O}_2 \quad (I)$$

(in Formula (I), 0≤x≤0.2, 0<y≤0.4, 0≤z≤0.4, 0≤w≤0.1, and M is one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn).

From the viewpoint of obtaining a lithium secondary battery having high cycle characteristics, x in Formula (I) is preferably more than 0, more preferably 0.01 or more, and even more preferably 0.02 or more. In addition, from the viewpoint of obtaining a lithium secondary battery having higher initial Coulombic efficiency, x in Formula (I) is preferably less than 0.2, more preferably 0.10 or less, and even more preferably 0.06 or less.

The upper limit and the lower limit of x can be randomly combined. For example, x is preferably more than 0 and less than 0.2, more preferably 0.01 or more and 0.10 or less, and even more preferably 0.02 or more and 0.06 or less.

In addition, from the viewpoint of obtaining a lithium secondary battery having low battery resistance, y in Formula (I) is preferably 0.05 or more, more preferably 0.10 or more, and even more preferably 0.15 or more. y in Formula (I) is preferably 0.39 or less, more preferably 0.35 or less, and even more preferably 0.33 or less.

The upper limit and the lower limit of y can be randomly combined. For example, y is preferably 0.05 or more and 0.39 or less, more preferably 0.10 or more and 0.35 or less, and even more preferably 0.15 or more and 0.33 or less.

In addition, from the viewpoint of obtaining a lithium secondary battery having high cycle characteristics, z in Formula (I) is preferably 0.01 or more, and more preferably 0.03 or more. In addition, z in Formula (I) is preferably 0.39 or less, more preferably 0.38 or less, and even more preferably 0.35 or less.

The upper limit and the lower limit of z can be randomly combined. For example, z is preferably 0.01 or more and 0.39 or less, and more preferably 0.03 or more and 0.35 or less.

In addition, from the viewpoint of obtaining a lithium secondary battery having low battery resistance, w in Formula (I) is preferably more than 0, more preferably 0.0005 or more, and even more preferably 0.001 or more. In addition, w in Formula (I) is preferably 0.09 or less, more preferably 0.08 or less, and even more preferably 0.07 or less.

The upper limit and the lower limit of w can be randomly combined. For example, w is preferably more than 0 and 0.09 or less, more preferably 0.0005 or more and 0.08 or less, and even more preferably 0.001 or more and 0.07 or less.

M in Formula (I) is one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn. As can be seen from the case where w in Formula (I) is 0, M is an optionally contained metal.

Furthermore, from the viewpoint of obtaining a lithium secondary battery having high cycle characteristics, M in Formula (I) is preferably one or more metals selected from the group consisting of Ti, Mg, Al, W, B, and Zr, and is preferably one or more metals selected from the group consisting of Al, W, B, and Zr.

[Tap Density]

The tap density of the positive-electrode active material for a lithium secondary battery of the present embodiment is preferably 1.1 g/cc or more, more preferably 1.2 g/cc or more, and particularly preferably 1.3 g/cc or more. The upper limit of the tap density is not particularly limited, but is, for example, 2.5 g/cc. When the tap density is 1.1 g/cc or more and 2.5 g/cc or less, in a case where a positive electrode described later is manufactured, the density of the positive electrode can be increased.

As the tap density, a value obtained by the method described in JIS R 1628-1997 is used.

(Layered Structure)

The crystal structure of the lithium composite metal oxide is a layered structure, and more preferably a hexagonal crystal structure or a monoclinic crystal structure.

The hexagonal crystal structure belongs to any one space group selected from the group consisting of P3, $P3_1$, $P3_2$, R3, P-3, R-3, P312, P321, $P3_1 12$, $P3_1 21$, $P3_2 12$, $P3_2 21$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3/m$, P622, $P6_1 22$, $P6_5 22$, $P6_2 22$, $P6_4 22$, $P6_3 22$, P6mm, P6cc, P63cm, $P6_3 mc$, P-6m2, P-6c2, P-62m, P-62c, P6/mmm, P6/mcc, $P6_3/mcm$, and $P6_3/mmc$.

In addition, the monoclinic crystal structure belongs to any one space group selected from the group consisting of P2, $P2_1$, C2, Pm, Pc, Cm, Cc, P2/m, $P2_1/m$, C2/m, P2/c, $P2_1/c$, and C2/c.

Among these, from the viewpoint of obtaining a lithium secondary battery having a high discharge capacity, the crystal structure is particularly preferably a hexagonal crystal structure belonging to the space group R-3m, or a monoclinic crystal structure belonging to C2/m.

<Manufacturing Method of Positive-Electrode Active Material for Lithium Secondary Battery>

The positive-electrode active material for a lithium secondary battery of the present invention preferably includes a step of manufacturing a composite metal compound containing nickel, cobalt, and manganese, and M as desired, and a step of manufacturing a lithium composite metal compound using the composite metal compound and a lithium compound.

In manufacturing of the positive-electrode active material for a lithium secondary battery of the present invention, first, a composite metal compound containing metals other than lithium, that is, Ni, Co, and Mn, which are essential metals, and one or more optional metals of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn is prepared. Thereafter, the composite metal compound is calcined with an appropriate lithium salt. The optional metal is a metal optionally contained in the composite metal compound as desired, and the optional metal may not be contained in the composite metal compound in some cases.

As the composite metal compound, a composite metal hydroxide or a composite metal oxide is preferable.

Hereinafter, an example of a manufacturing method of a positive-electrode active material will be described by separately describing the step of manufacturing the composite metal compound and the step of manufacturing the lithium composite metal oxide.

(Step of Manufacturing Composite Metal Compound)

The composite metal compound can be manufactured by a generally known batch coprecipitation method or continuous coprecipitation method. Hereinafter, the manufacturing method will be described in detail, taking a composite metal hydroxide containing nickel, cobalt, and manganese as metals as an example.

First, a nickel salt solution, a cobalt salt solution, a manganese salt solution, and a complexing agent are reacted by a coprecipitation method, particularly a continuous method described in Japanese Patent Application No. 2002-201028, to manufacture a nickel cobalt manganese composite metal hydroxide.

A nickel salt which is a solute of the nickel salt solution is not particularly limited, and for example, any of nickel sulfate, nickel nitrate, nickel chloride, and nickel acetate can be used. As a cobalt salt which is a solute of the cobalt salt solution, for example, any of cobalt sulfate, cobalt nitrate, and cobalt chloride can be used. As a manganese salt which is a solute of the manganese salt solution, for example, any of manganese sulfate, manganese nitrate, and manganese chloride can be used. The above metal salts are used in proportions corresponding to the composition ratio of Formula (I). Also, water is used as a solvent.

The complexing agent is capable of forming a complex with ions of nickel, cobalt, and manganese in an aqueous solution, and examples thereof include ammonium ion donors (ammonium sulfate, ammonium chloride, ammonium carbonate, ammonium fluoride, and the like), hydrazine, ethylenediaminetetraacetic acid, nitrilotriacetic acid, uracildiacetic acid, and glycine. The complexing agent may not be contained, and in a case where the complexing agent is contained, the amount of the complexing agent contained in the mixed solution containing the nickel salt solution, the cobalt salt solution, the manganese salt solution, and the complexing agent is, for example, more than 0 and 2.0 or less in terms of molar ratio to the sum of the number of moles of the metal salts.

During the precipitation, an alkali metal hydroxide (for example, sodium hydroxide, or potassium hydroxide) is added, if necessary, in order to adjust the pH value of the aqueous solution.

When the nickel salt solution, the cobalt salt solution, and the manganese salt solution in addition to the complexing agent are continuously supplied to a reaction tank, nickel, cobalt, and manganese react, whereby the nickel cobalt manganese composite metal hydroxide is manufactured.

During the reaction, the temperature of the reaction tank is controlled within a range of, for example, 20° C. or higher and 80° C. or lower, and preferably 30° C. or higher and 70° C. or lower.

The pH value in the reaction tank is controlled within a range of, for example, of a pH of 9 or higher and a pH of 13 or lower, and preferably a pH of 11 or higher and a pH of 13 or lower when the temperature of the aqueous solution is 40° C. By controlling this pH within the above range, a secondary particle having a high void proportion in a desired center portion of the present invention can be manufactured.

The substance in the reaction tank is appropriately stirred. The solutions are mixed and stirred under the condition that the temperature of the reaction tank is held at 40° C. or higher and the ratios of the weights of the nickel, cobalt, and manganese as metals to the weight of the alkali metal hydroxide become 0.9 or more, whereby the true sphericity of the secondary particle can be controlled within the desired range of the present invention. As the reaction tank, a type which causes formed reaction precipitates to overflow for separation can be used.

In addition, the reaction tank is in an appropriate oxygen-containing atmosphere or in the presence of an oxidizing agent while maintaining an inert atmosphere, whereby a secondary particle having a high void proportion in a desired center portion of the present invention can be manufactured. In order to cause the reaction tank to be in the oxygen-containing atmosphere, an oxygen-containing gas may be introduced into the reaction tank.

As the oxygen-containing gas, oxygen gas, air, or a mixed gas of these and an oxygen-free gas such as nitrogen gas can be used. Among these, the mixed gas is preferable from the viewpoint of ease of adjustment of the oxygen concentration in the oxygen-containing gas.

By appropriately controlling the concentrations of the metal salts supplied to the reaction tank, the stirring speed, the reaction temperature, the reaction pH, calcining conditions, which will be described later, and the like, the finally obtained positive-electrode active material for a lithium secondary battery can be controlled to have the desired physical properties.

After the above reaction, the obtained reaction precipitate is washed with water and then dried to isolate a nickel cobalt manganese composite hydroxide as a nickel cobalt manganese composite compound. In addition, the reaction precipitate may be washed with a weak acid water or an alkaline solution containing sodium hydroxide or potassium hydroxide, as necessary. In the above example, the nickel cobalt manganese composite hydroxide is manufactured, but a nickel cobalt manganese composite oxide may be prepared.

When a composite oxide of nickel, cobalt, and an optional metal M from a composite hydroxide of nickel, cobalt, and an optional metal M, an oxidation step of oxidizing the hydroxide to the oxide by performing calcining at a temperature of 300° C. or higher and 800° C. or lower in a range of 1 hour or longer and 10 hours or shorter may be performed.

(Step of Manufacturing Lithium Composite Metal Oxide)
Mixing Step

The composite metal oxide or hydroxide is dried and thereafter mixed with a lithium salt.

As the lithium salt, any one or two or more of lithium carbonate, lithium nitrate, lithium sulfate, lithium acetate, lithium hydroxide, lithium hydroxide hydrate, lithium oxide, lithium chloride, and lithium fluoride can be mixed and used.

Among these, one or both of lithium hydroxide and lithium carbonate are preferable.

From the viewpoint of viscosity stability of a positive-electrode mixture paste, which will be described later, the lithium carbonate component contained in the lithium composite metal oxide is preferably 0.4 mass % or less, more preferably 0.35 mass % or less, and particularly preferably 0.30 mass % or less.

Furthermore, from the viewpoint of suppressing gas generation in a lithium secondary battery, which will be described later, the lithium hydroxide component contained in the lithium composite metal oxide powder is preferably 0.35 mass % or less, more preferably 0.25 mass % or less, and particularly preferably 0.2 mass % or less.

After drying the composite metal oxide or hydroxide, classification may be appropriately performed thereon. The lithium salt and the composite metal hydroxide are used in consideration of the composition ratio of the final object. For example, in a case of using a nickel cobalt manganese composite hydroxide, the lithium salt and the composite metal hydroxide are used in proportions corresponding to the composition ratio of Formula (I).

Main Calcining Step

By calcining a mixture of the nickel cobalt manganese composite metal oxide or hydroxide and the lithium salt, a lithium-nickel cobalt manganese composite metal oxide is obtained. For the calcining, dry air, oxygen atmosphere, inert atmosphere, and the like are used depending on the desired composition, and a main calcining step having a plurality of heating steps is performed as necessary.

The calcining temperature of the composite metal oxide or hydroxide and the lithium compound such as lithium hydroxide or lithium carbonate is not particularly limited, but is preferably 700° C. or higher and 1100° C. or lower, more preferably 750° C. or higher and 1050° C. or lower, and even more preferably 800° C. or higher and 1025° C. or lower. Here, the calcining temperature means the temperature of the atmosphere in a calcining furnace, is the highest temperature of the retention temperature in the main calcining step (hereinafter, sometimes referred to as the highest retention temperature), and in a case of the main calcining step having the plurality of heating steps, means the temperature during heating at the highest retention temperature.

The calcining time is preferably 3 hours or longer and 50 hours or shorter. When the calcining time exceeds 50 hours, the battery performance tends to be substantially deteriorated due to volatilization of lithium. When the calcining time is shorter than 3 hours, the crystals develop poorly, and the battery performance tends to be deteriorated.

In the present embodiment, the temperature rising rate of the heating step in which the highest retention temperature is reached is preferably 180° C./hr or more, more preferably 200° C./hr or more, and particularly preferably 250° C./hr or more.

The temperature rising rate of the heating step in which the highest retention temperature is reached is calculated from the time from when the temperature rising is started until a retention temperature, which will be described later, is reached in a calcining apparatus.

By causing the temperature rising rate to be in the above specific range, a lithium composite metal oxide having a high void proportion in the center portion of the secondary particles can be manufactured.

Washing Step

After the calcining, the obtained calcined product may be washed. For the washing, pure water or an alkaline washing solution can be used.

Examples of the alkaline washing solution include one or more anhydrides selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), and $(NH_4)_2CO_3$ (ammonium carbonate), and aqueous solutions of the hydrates thereof. Moreover, ammonia can also be used as an alkali.

In the washing step, as a method of bringing the washing solution and the lithium composite metal oxide into contact with each other, there are a method of adding the lithium composite metal oxide into the aqueous solution of each washing solution and stirring the resultant, a method of applying the aqueous solution of each washing solution as shower water to the lithium composite metal oxide, and a method of adding the lithium composite metal oxide into the aqueous solution of each washing solution, stirring the resultant, separating the lithium composite metal oxide from the aqueous solution of each washing solution, and then applying the aqueous solution of each washing solution as shower water to the lithium composite metal oxide after being separated.

Manufacturing method of positive-electrode active material for lithium secondary battery having coating particles or coating layer In a case of manufacturing the positive-electrode active material for a lithium secondary battery which has a coating particle or a coating layer, a coating raw material and a lithium composite metal oxide are first mixed. Next, by performing a heat treatment as necessary, coating particles or a coating layer made of the coating raw material can be formed on the surface of primary particles or secondary particles of the lithium composite metal oxide.

As the coating raw material, an oxide, hydroxide, carbonate, nitrate, sulfate, halide, oxalate, or alkoxide of one or more elements selected from the group consisting of aluminum, boron, titanium, zirconium, and tungsten can be used, and an oxide is preferable. As the coating raw material, there are aluminum oxide, aluminum hydroxide, aluminum sulfate, aluminum chloride, aluminum alkoxide, boron oxide, boric acid, titanium oxide, titanium chloride, titanium alkoxide, zirconium oxide, tungsten oxide, and tungstic acid, and aluminum oxide, aluminum hydroxide, boron oxide, boric acid, zirconium oxide, and tungsten oxide are preferable.

In order to more efficiently coat the surface of the lithium composite metal oxide with the coating raw material, the coating raw material is preferably finer than the secondary particle of the lithium composite metal oxide. Specifically, the average secondary particle diameter of the lithium composite metal oxide is preferably 1 to 30 μm, and more preferably 3 to 20 μm. The average secondary particle diameter of the coating raw material is preferably 1 μm or less, and more preferably 0.1 μm or less. The lower limit of the average secondary particle diameter of the coating raw material is preferably as small as possible, and for example, is 0.001 μm.

The average secondary particle diameters of the lithium composite metal oxide and the coating raw material can be measured using a laser diffraction/scattering particle size distribution measuring apparatus. Specifically, using a laser diffraction particle size distribution meter (product number: LA-950, manufactured by HORIBA, Ltd.), 0.1 g of a lithium nickel composite metal compound was poured into 50 ml of a 0.2 mass % sodium hexametaphosphate aqueous solution to obtain a dispersion liquid in which the lithium composite metal oxide or the coating raw material is dispersed. The particle size distribution of the obtained dispersion liquid is measured to obtain a volume-based cumulative particle size distribution curve. In the obtained cumulative particle size distribution curve, the value of the particle diameter (D50) viewed from the fine particle side at a 50% cumulative point is referred to as the average secondary particle diameter of the lithium composite metal oxide or the coating raw material.

The mixing of the coating raw material and the lithium composite metal oxide may be performed in the same manner as the mixing during the manufacturing of the lithium composite metal oxide. A method of mixing using a mixing apparatus that does not include mixing media such as balls and does not involve strong pulverization, of which examples include a method of mixing using a powder mixer equipped with a stirring blade inside, is preferable. Furthermore, the coating layer can be more firmly attached to the surface of the lithium composite metal oxide by being held in an atmosphere containing water after mixing.

The heat treatment conditions (temperature, retention time) in the heat treatment performed as necessary after the mixing of the coating raw material and the lithium composite metal oxide may vary depending on the kind of the coating raw material. The heat treatment temperature is preferably set to be in a range of 300° C. or higher and 850° C. or lower, and is preferably a temperature equal to or lower than the calcining temperature of the lithium composite metal oxide. When the temperature is higher than the calcining temperature of the lithium composite metal oxide, there are cases where the coating raw material is dissolved in the lithium composite metal oxide and the coating layer is not formed. The retention time in the heat treatment is preferably set to be shorter than the retention time at the time of calcining. As an atmosphere in the heat treatment, an atmosphere gas similar to that in the above-described calcining can be adopted.

The positive-electrode active material for a lithium secondary battery can be obtained by forming the coating layer on the surface of the lithium composite metal oxide using a technique such as sputtering, CVD, or vapor deposition.

Moreover, there are cases where the positive-electrode active material for a lithium secondary battery is obtained by mixing and calcining the composite metal oxide or hydroxide, the lithium salt, and the coating raw material.

The positive-electrode active material for a lithium secondary battery provided with the coating layer on the surface of the primary particles or secondary particles of the lithium composite metal oxide is appropriately crushed and classified to be a positive-electrode active material for a lithium secondary battery.

<Lithium Secondary Battery>

Next, a positive electrode using the positive-electrode active material for a lithium secondary battery of the present invention as a positive-electrode active material for a lithium secondary battery, and a lithium secondary battery having the positive electrode will be described while describing the configuration of the lithium secondary battery.

An example of the lithium secondary battery of the present embodiment includes a positive electrode, a negative electrode, a separator interposed between the positive electrode and the negative electrode, and an electrolytic solution disposed between the positive electrode and the negative electrode.

Figure 1B:
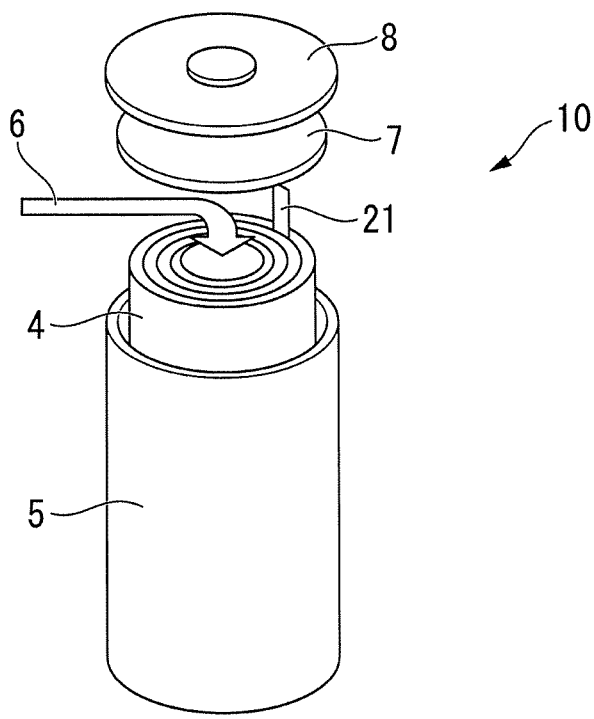
FIG. 1B is a schematic configuration view illustrating an example of the lithium-ion secondary battery.

FIGS. 1A and 1B are schematic views illustrating an example of the lithium secondary battery of the present embodiment. A cylindrical lithium secondary battery 10 of the present embodiment is manufactured as follows.

First, as illustrated in FIG. 1A, a pair of separators 1 having a strip shape, a strip-shaped positive electrode 2 having a positive electrode lead 21 at one end, and a strip-like negative electrode 3 having a negative electrode lead 31 at one end are stacked in order of the separator 1, the positive electrode 2, the separator 1, and the negative electrode 3 and are wound to form an electrode group 4.

Next, as shown in FIG. 1B, the electrode group 4 and an insulator (not illustrated) are accommodated in a cell can 5, the can bottom is then sealed, the electrode group 4 is impregnated with an electrolytic solution 6, and an electrolyte is disposed between the positive electrode 2 and the negative electrode 3. Furthermore, the upper portion of the cell can 5 is sealed with a top insulator 7 and a sealing body 8, whereby the lithium secondary battery 10 can be manufactured.

The shape of the electrode group 4 is, for example, a columnar shape such that the cross-sectional shape when the electrode group 4 is cut in a direction perpendicular to the winding axis is a circle, an ellipse, a rectangle, or a rectangle with rounded corners.

In addition, as a shape of the lithium secondary battery having the electrode group 4, a shape defined by IEC60086 which is a standard for a cell defined by the International Electrotechnical Commission (IEC), or by JIS C 8500 can be adopted. For example, shapes such as a cylindrical shape and a square shape can be adopted.

Furthermore, the lithium secondary battery is not limited to the wound type configuration, and may have a stacked type configuration in which a stacked structure of a positive electrode, a separator, a negative electrode, and a separator is repeatedly stacked. The stacked type lithium secondary battery can be exemplified by a so-called coin type cell, a button type cell, and a paper type (or sheet type) cell.

Hereinafter, each configuration will be described in order.

(Positive Electrode)

The positive electrode of the present embodiment can be manufactured by first adjusting a positive-electrode mixture containing a positive-electrode active material, a conductive material, and a binder, and causing a positive electrode current collector to hold the positive-electrode mixture.

(Conductive Material)

A carbon material can be used as the conductive material included in the positive electrode of the present embodiment. As the carbon material, there are graphite powder, carbon black (for example, acetylene black), a fibrous carbon material, and the like. Since carbon black is fine particles and has a large surface area, the addition of a small amount of carbon black to the positive-electrode mixture increases the conductivity inside the positive electrode and thus improves the charge and discharge efficiency and output characteristics. However, when too much carbon black is added, both the binding force between the positive-electrode mixture and the positive electrode current collector and the binding force inside the positive-electrode mixture by the binder decrease, which causes an increase in internal resistance.

The proportion of the conductive material in the positive-electrode mixture is preferably 5 parts by mass or more and 20 parts by mass or less with respect to 100 parts by mass of the positive-electrode active material. In a case of using a fibrous carbon material such as graphitized carbon fiber or carbon nanotube as the conductive material, the proportion can be reduced. The ratio of the positive-electrode active material to the total mass of the positive-electrode mixture is preferably 80 to 98 mass %.

(Binder)

A thermoplastic resin can be used as the binder included in the positive electrode of the present embodiment.

As the thermoplastic resin, fluorine resins such as polyvinylidene fluoride (hereinafter, sometimes referred to as PVdF), polytetrafluoroethylene (hereinafter, sometimes referred to as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene can be adopted.

These thermoplastic resins may be used as a mixture of two or more. By using a fluorine resin and a polyolefin resin as the binder and setting the ratio of the fluorine resin to the entire positive-electrode mixture to 1 mass % or more and 10 mass % or less and the ratio of the polyolefin resin to 0.1 mass % or more and 2 mass % or less, a positive-electrode mixture having both high adhesion to the positive electrode current collector and high bonding strength in the positive-electrode mixture can be obtained.

(Positive Electrode Current Collector)

As the positive electrode current collector included in the positive electrode of the present embodiment, a strip-shaped member formed of a metal material such as Al, Ni, or stainless steel as the forming material can be used. Among these, from the viewpoint of easy processing and low cost, it is preferable to use Al as the forming material and process Al into a thin film.

As a method of causing the positive electrode current collector to hold the positive-electrode mixture, a method of press-forming the positive-electrode mixture on the positive electrode current collector can be adopted. In addition, the positive-electrode mixture may be held by the positive electrode current collector by forming the positive-electrode mixture into a paste using an organic solvent, applying the paste of the positive-electrode mixture to at least one side of the positive electrode current collector, drying the paste, and pressing the paste to be fixed.

In a case of forming the positive-electrode mixture into a paste, as the organic solvent which can be used, amine solvents such as N,N-dimethylaminopropylamine and diethylenetriamine; ether solvents such as tetrahydrofuran; ketone solvents such as methyl ethyl ketone; ester solvents such as methyl acetate; and amide solvents such as dimethylacetamide and N-methyl-2-pyrrolidone (hereinafter, sometimes referred to as NMP) can be adopted.

Examples of a method of applying the paste of the positive-electrode mixture to the positive electrode current collector include a slit die coating method, a screen coating method, a curtain coating method, a knife coating method, a gravure coating method, and an electrostatic spraying method.

The positive electrode can be manufactured by the method mentioned above.

(Negative Electrode)

The negative electrode included in the lithium secondary battery of the present embodiment may be capable of being doped with or dedoped from lithium ions at a potential lower than that of the positive electrode, and an electrode in which a negative-electrode mixture containing a negative-electrode active material is held by a negative electrode current collector, and an electrode formed of a negative-electrode active material alone can be adopted.

(Negative-Electrode Active Material)

As the negative-electrode active material included in the negative electrode, materials that can be doped with or dedoped from lithium ions at a potential lower than that of the positive electrode, such as carbon materials, chalcogen compounds (oxides, sulfides, and the like), nitrides, metals, and alloys can be adopted.

As the carbon materials that can be used as the negative-electrode active material, graphite such as natural graphite and artificial graphite, cokes, carbon black, pyrolytic carbons, carbon fibers, and an organic polymer compound calcined body can be adopted.

As the oxides that can be used as the negative-electrode active material, oxides of silicon expressed by the formula $SiO_x$ (where, x is a positive real number) such as $SiO_2$ and SiO; oxides of titanium expressed by the formula $TiO_x$ (where x is a positive real number) such as $TiO_2$ and TiO; oxides of vanadium expressed by the formula $VO_x$ (where x is a positive real number) such as $V_2O_5$ and $VO_2$; oxides of iron expressed by the formula $FeO_x$ (where x is a positive real number) such as $Fe_3O_4$, $Fe_2O_3$, and FeO; oxides of tin expressed by the formula $SnO_x$ (where x is a positive real number) such as $SnO_2$ and SnO; oxides of tungsten expressed by a general formula $WO_x$ (where, x is a positive real number) such as $WO_3$ and $WO_2$; and composite metal oxides containing lithium and titanium or vanadium such as $Li_4Ti_5O_{12}$ and $LiVO_2$ can be adopted.

As the sulfides that can be used as the negative-electrode active material, sulfides of titanium expressed by the formula $TiS_x$ (where, x is a positive real number) such as $Ti_2S_3$, $TiS_2$, and TiS; sulfides of vanadium expressed by the formula $VS_x$ (where x is a positive real number) such $V_3S_4$, $VS_2$, and VS; sulfides of iron expressed by the formula $FeS_x$ (where x is a positive real number) such as $Fe_3S_4$, $FeS_2$, and FeS; sulfides of molybdenum expressed by the formula $MoS_x$ (where x is a positive real number) such as $Mo_2S_3$ and $MoS_2$; sulfides of tin expressed by the formula $SnS_x$ (where x is a positive real number) such as $SnS_2$ and SnS; sulfides of tungsten expressed by $WS_x$ (where x is a positive real number) such as $WS_2$; sulfides of antimony expressed by the formula $SbS_x$ (where x is a positive real number) such as $Sb_2S_3$; and sulfides of selenium expressed by the formula $SeS_x$ (where x is a positive real number) such as $Se_5S_3$, $SeS_2$, and SeS can be adopted.

As the nitrides that can be used as the negative-electrode active material, lithium-containing nitrides such as $Li_3N$ and $Li_{3-x}A_xN$ (where A is either one or both of Ni and Co, and $0<x<3$ is satisfied) can be adopted.

These carbon materials, oxides, sulfides, and nitrides may be used singly or in combination of two or more. In addition, these carbon materials, oxides, sulfides, and nitrides may be either crystalline or amorphous.

Moreover, as the metals that can be used as the negative-electrode active material, lithium metal, silicon metal, tin metal, and the like can be adopted.

As the alloys that can be used as the negative-electrode active material, lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$ can be adopted.

These metals and alloys are mainly used alone as an electrode after being processed into, for example, a foil shape.

Among the above-mentioned negative-electrode active materials, the carbon material mainly including graphite such as natural graphite and artificial graphite is preferably used because the potential of the negative electrode hardly changes from the uncharged state to the fully charged state during charging (the potential flatness is good), the average discharge potential is low, and the capacity retention ratio during repeated charging and discharging is high (the cycle characteristics are good). The shape of the carbon material may be, for example, a flaky shape such as natural graphite, a spherical shape such as mesocarbon microbeads, a fibrous shape such as graphitized carbon fiber, or an aggregate of fine powder.

The negative-electrode mixture described above may contain a binder as necessary. As the binder, a thermoplastic resin can be adopted, and specifically, PVdF, thermoplastic polyimide, carboxymethylcellulose, polyethylene, and polypropylene can be adopted.

(Negative Electrode Current Collector)

As the negative electrode current collector included in the negative electrode, a strip-shaped member formed of a metal material, such as Cu, Ni, and stainless steel, as the forming material can be adopted. Among these, it is preferable to use Cu as the forming material and process Cu into a thin film because Cu is less likely to form an alloy with lithium and can be easily processed.

As a method of causing the negative electrode current collector to hold the negative-electrode mixture, similarly to the case of the positive electrode, a method using press-forming, or a method of forming the negative-electrode mixture into a paste using a solvent or the like, applying the paste onto the negative electrode current collector, drying the paste, and pressing the paste to be compressed can be adopted.

(Separator)

As the separator included in the lithium secondary battery of the present embodiment, for example, a material having a form such as a porous film, non-woven fabric, or woven fabric made of a material such as a polyolefin resin such as polyethylene and polypropylene, a fluorine resin, and a nitrogen-containing aromatic polymer can be used. In addition, two or more of these materials may be used to form the separator, or these materials may be stacked to form the separator.

In the present embodiment, the air resistance of the separator according to the Gurley method defined by JIS P 8117 is preferably 50 sec/100 cc or more and 300 sec/100 cc or less, and more preferably 50 sec/100 cc or more and 200 sec/100 cc or less in order for the electrolyte to favorably permeate therethrough during cell use (during charging and discharging).

In addition, the void fraction of the separator is preferably 30 vol % or more and 80 vol % or less, and more preferably 40 vol % or more and 70 vol % or less with respect to the volume of the separator. The separator may be a laminate of separators having different porosity.

(Electrolytic Solution)

The electrolytic solution included in the lithium secondary battery of the present embodiment contains an electrolyte and an organic solvent.

As the electrolyte contained in the electrolytic solution, lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (here, BOB refers to bis(oxalato)borate), LiFSI (here, FSI refers to bis(fluorosulfonyl)imide), lower aliphatic carboxylic acid lithium salts, and $LiAlCl_4$ can be adopted, and a mixture of two or more of these may be used. Among these, as the electrolyte, it is preferable to use at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$, which contain fluorine.

As the organic solvent included in the electrolytic solution, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and y-butyrolactone; nitriles such as acetonitrile and butyronitrile; amides such as N,N-dimethylformamide and N,N-dimethylacetamide; carbamates such as 3-methyl-2-oxazolidone; and sulfur-containing compounds such as sulfolane, dimethyl sulfoxide, and 1,3-propanesultone, or those obtained by introducing a fluoro group into these organic solvents (those in which one or more of the hydrogen atoms of the organic solvent are substituted with a fluorine atom) can be used.

As the organic solvent, it is preferable to use a mixture of two or more thereof. Among these, a mixed solvent containing a carbonate is preferable, and a mixed solvent of a cyclic carbonate and a non-cyclic carbonate and a mixed solvent of a cyclic carbonate and an ether are more preferable. As the mixed solvent of a cyclic carbonate and a non-cyclic carbonate, a mixed solvent containing ethylene carbonate, dimethyl carbonate, and ethyl methyl carbonate is preferable. An electrolytic solution using such a mixed solvent has many features such as a wide operating temperature range, being less likely to deteriorate even when charged and discharged at a high current rate, being less likely to deteriorate even during a long-term use, and being non-degradable even in a case where a graphite material such as natural graphite or artificial graphite is used as the negative-electrode active material.

Furthermore, as the electrolytic solution, it is preferable to use an electrolytic solution containing a lithium salt containing fluorine such as $LiPF_6$ and an organic solvent having a fluorine substituent in order to enhance the safety of the obtained lithium secondary battery. A mixed solvent containing ethers having a fluorine substituent, such as pentafluoropropyl methyl ether and 2,2,3,3-tetrafluoropropyl difluoromethyl ether and dimethyl carbonate is even more preferable because the capacity retention ratio is high even when charging or discharging is performed at a high current rate.

A solid electrolyte may be used instead of the electrolytic solution. As the solid electrolyte, for example, an organic polymer electrolyte such as a polyethylene oxide-based polymer compound, or a polymer compound containing at least one or more of a polyorganosiloxane chain or a polyoxyalkylene chain can be used. A so-called gel type in which a non-aqueous electrolytic solution is held in a polymer compound can also be used. Inorganic solid electrolyte containing sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ can be adopted, and a mixture or two or more thereof may be used. By using these solid electrolyte, the safety of the lithium secondary battery may be further enhanced.

In addition, in a case of using a solid electrolyte in the lithium secondary battery of the present embodiment, there may be cases where the solid electrolyte plays a role of the separator, and in such a case, the separator may not be required.

Since the positive-electrode active material having the above-described configuration uses the lithium-containing composite metal oxide of the present embodiment described above, the initial charge/discharge efficiency of the lithium secondary battery using the positive-electrode active material can be improved.

Moreover, since the positive electrode having the above-described configuration has the positive-electrode active material for a lithium secondary battery of the present embodiment described above, the initial charge/discharge efficiency of the lithium secondary battery can be improved.

Furthermore, since the lithium secondary battery having the above-described configuration has the positive electrode described above, a secondary battery having a higher initial charge/discharge efficiency than in the related art can be achieved.

An aspect of the present invention is as follows.

[1] A positive-electrode active material for a lithium secondary battery including: a secondary particle in which a plurality of primary particles of a lithium composite metal oxide are aggregated, in which the secondary particle has a void formed therein and a through-hole that connects the void to a surface of the secondary particle, and the positive-electrode active material for a lithium secondary battery satisfies all of the following (i) to (iii):

(i) in a cross section of the secondary particle, a ratio (B/A) of a minor axis length B of a figure surrounded by an outer edge of the cross section to a major axis length A of the figure is 0.78 or more and 1.0 or less, (ii) a proportion of a total area of the void exposed in the cross section to an area of the figure is 4.0% or more and 20% or less, and (iii) a proportion of an area of the void present in a center portion of the secondary particle among the void exposed in the cross section to the total area of the void exposed in the cross section is 80% or more and 98% or less, where the major axis length is the longest diameter among diameters of the figure passing through a position of center of mass of the figure in the figure, and when a circle having a radius of r calculated by the following formula in which the area of the figure is S and the position of center of mass of the figure is a center is assumed, the center portion is a portion surrounded by the circle.

$$r=(S/\pi)^{0.5}/2$$

[2] In the positive-electrode active material for a lithium secondary battery according to [1], a void fraction in the center portion of the secondary particle may be 15% or more and 45% or less.

[3] In the positive-electrode active material for a lithium secondary battery according to [1] or [2], a void fraction in the surface portion of the secondary particle may be 0.10% or more and 3% or less (here, the surface portion is a portion excluding the center portion in the figure).

[4] In the positive-electrode active material for a lithium secondary battery according to any one of [1] to [3], the positive-electrode active material has a pore peak at a pore radius of 35 nm or more and 135 nm or less in a pore distribution measurement by a mercury intrusion method.

[5] In the positive-electrode active material for a lithium secondary battery according to any one of [1] to [4], a BET specific surface area of the secondary particles may be 0.7 m²/g or more and 1.5 m²/g or less.

[6] The positive-electrode active material for a lithium secondary battery according to any one of [1] to [5] may have a composition formula represented by Formula (I)

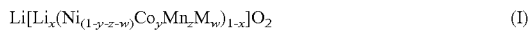

$\text{Li}[\text{Li}_x(\text{Ni}_{(1-y-z-w)}\text{Co}_y\text{Mn}_z\text{M}_w)_{1-x}]\text{O}_2$ (I)

(in Formula (I), $0.02 \leq x \leq 0.04$, $0.15 \leq y \leq 0.3$, $0.1 \leq z \leq 0.3$, $0 \leq w \leq 0.07$, and M is one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn).

[7] A positive electrode for a lithium secondary battery in which a mass ratio between the positive-electrode active material for a lithium secondary battery according to any one of [1] to [6], acetylene black, and PVdF is the positive electrode for a lithium secondary battery:acetylene black: PVdF=92:5:3 and an electrode area is 1.65 cm² is formed, and a coin type battery R2032 is produced including the positive electrode for a secondary battery, a separator in which a heat-resistant porous layer is laminated on a polyethylene porous film, an electrolytic solution obtained by adding 1 vol % of vinylene carbonate to a mixed solution of ethylene carbonate, dimethyl carbonate, and ethyl methyl carbonate in a ratio of 16:10:74 (volume ratio), and dissolving $\text{LiPF}_6$ to achieve 1.3 mol/l, and a negative electrode for a secondary battery which is a Cu film having a thickness of 12 μm, to which a negative-electrode mixture of artificial graphite, CMC, and SBR in a mass ratio of artificial graphite:CMC:SBR=98:1:1 is applied, and having an electrode area of 1.77 cm², and when a discharge rate test is performed on the coin type battery R2032 under the following charge/discharge test conditions, a 10 CA discharge capacity retention ratio calculated by Formula (II) is 70% or more.

10 CA discharge capacity retention ratio (%)=(Discharge capacity at 10 CA/discharge capacity at 0.2 CA)×100

<Discharge Rate Test Conditions>
Test temperature: 25° C.
Charging maximum voltage 4.2 V, charging time 6 hours, charging current 1 CA constant current constant voltage charging
Discharging minimum voltage 2.5 V, constant current discharging By obtaining the discharge capacity in the case of constant current discharging at 0.2 CA and the discharge capacity in the case of discharging at 10 CA, the 10 CA discharge capacity retention ratio obtained by the following formula was obtained. The higher the 10 CA discharge capacity retention ratio, the higher the output.

Another aspect of the present invention is as follows.

[1] A positive-electrode active material for a lithium secondary battery including: a secondary particle in which a plurality of primary particles of a lithium composite metal oxide are aggregated, in which the secondary particle has a void formed therein, and a through-hole that connects the void to a surface of the secondary particle, all of the following (i) to (iii) are satisfied, a void fraction in a center portion of the secondary particle is 20% or more and 40% or less, a void fraction in a surface portion of the secondary particle is 0.10% or more and 3% or less (here, the surface portion is a portion excluding the center portion in a figure described below), (i) in a cross section of the secondary particle, a ratio (B/A) of a minor axis length B of a figure surrounded by an outer edge of the cross section to a major axis length A of the figure is 0.75 or more and 1.0 or less, (ii) a proportion of a total area of the void exposed in the cross section to an area of the figure is 2.0% or more and 20% or less, and (iii) a proportion of an area of the void present in the center portion of the secondary particle among the void exposed in the cross section to the total area of the void exposed in the cross section is 60% or more and 99% or less, where the major axis length is the longest diameter among diameters of the figure passing through a position of center of mass of the figure in the figure, and when a circle having a radius of r calculated by the following formula in which the area of the figure is S and the position of center of mass of the figure is a center is assumed, the center portion is a portion surrounded by the circle.

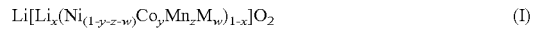

$r = (S/\pi)^{0.5}/2$

[2] The positive-electrode active material for a lithium secondary battery according to [1], in which the positive-electrode active material has a pore peak at a pore radius of 30 nm or more and 150 nm or less in a pore distribution measurement by a mercury intrusion method.

[3] The positive-electrode active material for a lithium secondary battery according to [1] or [2], in which a BET specific surface area of the secondary particles is 0.2 m²/g or more and 3.0 m²/g or less.

[4] The positive-electrode active material for a lithium secondary battery according to any one of [1] to [3], in which a composition formula of the lithium composite metal oxide is represented by Formula (I)

$\text{Li}[\text{Li}_x(\text{Ni}_{(1-y-z-w)}\text{Co}_y\text{Mn}_z\text{M}_w)_{1-x}]\text{O}_2$ (I)

(in Formula (I), $0.02 \leq x \leq 0.04$, $0.15 \leq y \leq 0.3$, $0.1 \leq z \leq 0.3$, $0 \leq w \leq 0.07$, and M is one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn).

[5] The positive-electrode active material for a lithium secondary battery according to [4], in which $0.15 \leq y \leq 0.4$ in Formula (I).

[6] A positive electrode for a lithium secondary battery, including: the positive-electrode active material for a lithium secondary battery according to any one of [1] to [5].

[7] A positive electrode for a lithium secondary battery including: the positive electrode for a lithium secondary battery according to [6].

EXAMPLES

Next, the present invention will be described in more detail with reference to examples.

In this example, evaluation of the lithium composite metal oxide was performed as follows.

<Compositional Analysis>

The compositional analysis of the lithium composite metal oxide manufactured by the method described below was performed by using an inductively coupled plasma emission analyzer (SPS 3000, manufactured by SII Nano Technology Inc.) after dissolving the powder of the obtained lithium composite metal oxide in hydrochloric acid.

<Cross Section Observation of Secondary Particles of Positive-Electrode Active Material for Lithium Secondary Battery>

The powder of the positive-electrode active material powder for a lithium secondary battery was processed with a focused ion beam processing apparatus (FB2200, manufactured by Hitachi High-Technologies Corporation) to produce a cross section passing through the approximate center of the secondary particles, and the cross section of the positive-electrode active material was observed as a scanning ion microscope image (SIM image) using the focused ion beam processing apparatus or observed as a scanning electron microscope image (SEM image) using a scanning electron microscope (S-4800, manufactured by Hitachi High-Technologies Corporation). Alternatively, the positive electrode was processed with an ion milling apparatus (IM4000, manufactured by Hitachi High-Technologies Corporation) to produce a cross section, and the cross section of the positive electrode was observed as an SEM image using a scanning electron microscope. In addition, a positive-electrode active material having a maximum diameter close to the 50% cumulative volume particle size D50 (μm) obtained by laser diffraction particle size distribution measurement was selected, and was photographed at a maximum magnification at which the particle of the positive-electrode active material was fitted in the photographed image frame. The area of the figure surrounded by the outer edge of the cross section thus obtained was referred to as a cross-sectional area S.

<Measurement Method of B/A>

The cross-sectional image was taken into a computer, and the major axis length A and the minor axis length B of the secondary particle were obtained using image analysis software Image J, and B/A was calculated.

[Measurement Method of Void Fraction]

For the cross-sectional area S of the cross section of the secondary particle calculated by image analysis, a circle having a radius of r calculated by the following formula with the position of center of mass of the secondary particle as the center was drawn, and the inside of the circle was referred to as a particle center portion while the outside of the circle was referred to as a particle surface portion.

$$r=(S/\pi)^{0.5}/2$$

The void fraction of the entire cross section of the secondary particle was calculated as follows.

Void fraction (%) of the entire cross section of the secondary particle=(total area of void parts present in the entire cross section of the secondary particle/cross sectional area $S$ of the cross section of the secondary particle)×100

The void fraction in the surface portion of the secondary particle was calculated as follows.

Void fraction (%) in the surface portion of the secondary particle=(total area of void parts present in the surface portion of the cross section of the secondary particle/area of the surface portion of the secondary particle)×100

The void fraction in the center portion of the secondary particle was calculated as follows.

Void fraction (%) in the center portion of the secondary particle=(total area of void parts present in the center portion of the secondary particle/area of the center portion of the secondary particle)×100

The proportion of the area of the voids present in the center portion of the secondary particle among the voids exposed in the cross section of the secondary particle to the total area of the voids exposed in the cross section of the secondary particle was calculated as follows.

Proportion (%) of the area of the voids present in the center portion of the secondary particle among the voids exposed in the cross section of the secondary particle to the total area of the voids exposed in the cross section of the secondary particle=(total area of the voids present in the center portion of the cross section of the secondary particle/total area of the voids present in the entire cross section of the secondary particle)×100

The above parameters were calculated for all samples, the average value of all the samples was calculated, and B/A and each void fraction were obtained.

<Measurement of Opening Width (Pore Peak) of Through-Hole>

Measurement of the pore peak of the positive-electrode active material for a lithium secondary battery by the mercury intrusion method As a pretreatment, the positive-electrode active material for a lithium secondary battery was subjected to constant temperature drying at 120° C. for 4 hours. Using AutoPore III 9420 (manufactured by Micromeritics Instrument Corporation), pore distribution measurement was performed under the following measurement conditions. The surface tension of mercury was 480 dynes/cm, and the contact angle between mercury and the sample was 140°. The results are shown in Table 1 as "pore diameter (nm)".

Measurement Conditions

Measurement temperature: 25° C.

Measurement pressure: 0.432 psia to 59245.2 psia

<Production of Positive Electrode for Lithium Secondary Battery>

A paste-like positive-electrode mixture was prepared by using the lithium composite metal oxide obtained by the manufacturing method described later as a positive-electrode active material, adding the positive-electrode active material, a conductive material (acetylene black), and a binder (PVdF) to achieve a composition of positive-electrode active material for a lithium secondary battery:conductive material:binder=92:5:3 (mass ratio), and performing kneading thereon. During the preparation of the positive-electrode mixture, N-methyl-2-pyrrolidone was used as an organic solvent.

The obtained positive-electrode mixture was applied to a 40 μm-thick Al foil serving as a current collector and dried in a vacuum at 150° C. for 8 hours to obtain a positive electrode for a lithium secondary battery. The electrode area of the positive electrode for a lithium secondary battery was set to 1.65 cm$^2$.

<Production of Negative Electrode for Lithium Secondary Battery>

Next, artificial graphite (MAGD manufactured by Hitachi Chemical Co., Ltd.) as a negative-electrode active material, and CMC (manufactured by DKS Co. Ltd.) and SBR (manufactured by NIPPON A&L INC.) as a binder were added to achieve a composition of negative-electrode active material:CMC:SBR=98:1:1 (mass ratio) and kneaded to prepare a paste-like negative-electrode mixture. During the preparation of the negative-electrode mixture, ion exchange water was used as a solvent.

The obtained negative-electrode mixture was applied to a 12 μm-thick Cu foil serving as a current collector and dried in a vacuum at 60° C. for 8 hours to obtain a negative electrode for a lithium secondary battery. The electrode area of the negative electrode for a lithium secondary battery was set to 1.77 cm².

<Production of Lithium Secondary Battery (Coin Type Full Cell)>

The following operation was performed in a glove box under an argon atmosphere.

The positive electrode for a lithium secondary battery produced in "(2) Production of Positive Electrode for Lithium Secondary Battery" was placed on the lower lid of a part for coin type cell R2032 (manufactured by Hohsen Corp.) with the aluminum foil surface facing downward, and a Laminated film separator (a heat-resistant porous layer (thickness 16 μm) was laminated on a polyethylene porous film) was placed thereon. 300 μl of the electrolytic solution was injected thereinto. As the electrolytic solution, an electrolytic solution obtained by adding 1 vol % of vinylene carbonate (hereinafter, sometimes referred to as VC) to a mixed solution of ethylene carbonate (hereinafter, sometimes referred to as EC), dimethyl carbonate (hereinafter, sometimes referred to as DMC), and ethyl methyl carbonate (hereinafter, sometimes referred to as EMC) in a ratio of 16:10:74 (volume ratio), and dissolving $LiPF_6$ to achieve 1.3 mol/l (hereinafter, sometimes referred to as $LiPF_6$/EC+DMC+EMC) was used.

Next, the negative electrode for a lithium secondary battery produced in <Production of Negative Electrode for Lithium Secondary Battery> was placed on the upper side of the laminated film separator, covered with the upper lid via a gasket, and caulked by a caulking machine, whereby a lithium secondary battery (coin type full cell R2032, hereinafter, sometimes referred to as "full cell") was produced.

Charge and Discharge Test

Using the cell produced by the above method, a discharge rate test was conducted under the following charge and discharge test conditions. Each 10 CA discharge capacity retention ratio in the discharge rate test was obtained as follows.

Discharge Rate Test

Test temperature: 25° C.

Charging maximum voltage 4.2 V, charging time 6 hours, charging current 1 CA constant current constant voltage charging Discharging minimum voltage 2.5 V, constant current discharging By obtaining the discharge capacity in the case of constant current discharging at 0.2 CA and the discharge capacity in the case of discharging at 10 CA, the 10 CA discharge capacity retention ratio obtained by the following formula was obtained. The higher the 10 CA discharge capacity retention ratio, the higher the output.

10 CA Discharge Capacity Retention Ratio

> 10 CA discharge capacity retention ratio (%)=(Discharge capacity at 10 CA/discharge capacity at 0.2 CA)×100

<BET Specific Surface Area Measurement>

After 1 g of the powder of the positive-electrode active material for a lithium secondary battery was dried in a nitrogen atmosphere at 105° C. for 30 minutes, the powder was measured using Macsorb (registered trademark) manufactured by MOUNTECH Co., Ltd.

<Measurement of Tap Density>

The tap density was obtained by the method described in JIS R 1628-1997.

Example 1

Manufacturing of Positive-Electrode Active Material 1 for Lithium Secondary Battery

[Step of Manufacturing Nickel Cobalt Manganese Composite Hydroxide]

After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.55:0.21:0.24, whereby a mixed raw material solution was prepared.

Next, the mixed raw material solution and an aqueous solution of ammonium sulfate as a complexing agent were continuously added into the reaction tank under stirring, and an oxygen-containing gas obtained by mixing air in nitrogen gas was continuously flowed so as to cause the oxygen concentration to be 1.7%. Each solution was supplied so that the ratio of the weight of nickel, cobalt, and manganese as metal to the weight of sodium hydroxide became 0.90, and continuously stirred at 50° C., whereby nickel cobalt manganese composite hydroxide particles were obtained. The obtained nickel cobalt manganese composite hydroxide particles were washed with a sodium hydroxide solution, then dehydrated with a centrifugal separator, isolated, and dried at 105° C., whereby a nickel cobalt manganese composite hydroxide 1 was obtained.

[Mixing Step]

The nickel cobalt manganese composite hydroxide 1 obtained as described above and lithium carbonate powder were weighed and mixed so that Li/(Ni+Co+Mn)=1.07 (molar ratio).

[Calcining Step]

Thereafter, the mixture obtained in the above mixing step was heated in an oxygen atmosphere at 271° C./hr and calcined at 870° C. for 5 hours, whereby a positive-electrode active material 1 for a lithium secondary battery containing the secondary particles of the lithium composite metal oxide was obtained.

Evaluation of Positive-Electrode Active Material 1 for Lithium Secondary Battery Compositional analysis of the lithium composite metal oxide of the obtained positive-electrode active material 1 for a lithium secondary battery was performed, and when the composition was made to correspond to Composition Formula (I), x=0.029, y=0.207, z=0.240, and w=0.000 were obtained.

The results of B/A of the cross section of the secondary particle of the positive-electrode active material 1 for a lithium secondary battery, the presence or absence of through-holes, the void fraction of the entire cross section of the particle, the void fraction of the center portion of the particle/the void fraction of the entire particle, the void fraction of the center portion of the particle, the void fraction of the surface of the particle, pore diameter, BET specific surface area, discharge rate characteristics, and tap density are described in Table 1.

Example 2

Manufacturing of Positive-Electrode Active Material 2 for Lithium Secondary Battery

[Step of Manufacturing Nickel Cobalt Manganese Composite Hydroxide]

After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.55:0.21:0.24, whereby a mixed raw material solution was prepared.

Next, the mixed raw material solution and an aqueous solution of ammonium sulfate as a complexing agent were continuously added into the reaction tank under stirring, and an oxygen-containing gas obtained by mixing air in nitrogen gas was continuously flowed so as to cause the oxygen concentration to be 6.1%. Each solution was supplied so that the ratio of the weight of nickel, cobalt, and manganese as metal to the weight of sodium hydroxide became 0.90, and continuously stirred, whereby nickel cobalt manganese composite hydroxide particles were obtained. The nickel cobalt manganese composite hydroxide particles were washed with a sodium hydroxide solution, then dehydrated with a centrifugal separator, isolated, and dried at 105° C., whereby a nickel cobalt manganese composite hydroxide 2 was obtained.

[Mixing Step]

The nickel cobalt manganese composite hydroxide 2 obtained as described above and lithium carbonate powder were weighed and mixed so that Li/(Ni+Co+Mn)=1.07 (molar ratio).

[Calcining Step]

Thereafter, the mixture obtained in the above mixing step was heated in an oxygen atmosphere at 271° C./hr and calcined at 870° C. for 5 hours, whereby a positive-electrode active material 2 for a lithium secondary battery containing the secondary particles of the lithium composite metal oxide was obtained.

Evaluation of Positive-Electrode Active Material 2 for Lithium Secondary Battery Compositional analysis of the lithium composite metal oxide of the obtained positive-electrode active material 2 for a lithium secondary battery was performed, and when the composition was made to correspond to Composition Formula (I), x=0.028, y=0.206, z=0.241, and w=0.000 were obtained.

The results of B/A of the cross section of the secondary particle of the positive-electrode active material 2 for a lithium secondary battery, the presence or absence of through-holes, the void fraction of the entire cross section of the particle, the void fraction of the center portion of the particle/the void fraction of the entire particle, the void fraction of the center portion of the particle, the void fraction of the surface of the particle, pore diameter, BET specific surface area, discharge rate characteristics, and tap density are described in Table 1.

Example 3

Manufacturing of Positive-Electrode Active Material 3 for Lithium Secondary Battery

[Step of Manufacturing Nickel Cobalt Manganese Composite Hydroxide]

After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.55:0.21:0.24, whereby a mixed raw material solution was prepared.

Next, the mixed raw material solution and an aqueous solution of ammonium sulfate as a complexing agent were continuously added into the reaction tank under stirring, and an oxygen-containing gas obtained by mixing air in nitrogen gas was continuously flowed so as to cause the oxygen concentration to be 6.1%. Each solution was supplied so that the ratio of the weight of nickel, cobalt, and manganese as metal to the weight of sodium hydroxide became 0.90, and continuously stirred at 50° C., whereby nickel cobalt manganese composite hydroxide particles were obtained. The nickel cobalt manganese composite hydroxide particles were washed with a sodium hydroxide solution, then dehydrated with a centrifugal separator, isolated, and dried at 105° C., whereby a nickel cobalt manganese composite hydroxide 3 was obtained.

[Mixing Step]

The nickel cobalt manganese composite hydroxide 3 obtained as described above and lithium carbonate powder were weighed and mixed so that Li/(Ni+Co+Mn)=1.07 (molar ratio).

[Calcining Step]

Thereafter, the mixture obtained in the above mixing step was heated in an oxygen atmosphere at 277° C./hr and calcined at 890° C. for 5 hours, whereby a positive-electrode active material 3 for a lithium secondary battery containing the secondary particles of the lithium composite metal oxide was obtained.

Evaluation of Positive-Electrode Active Material 3 for Lithium Secondary Battery Compositional analysis of the lithium composite metal oxide of the obtained positive-electrode active material 3 for a lithium secondary battery was performed, and when the composition was made to correspond to Composition Formula (I), x=0.032, y=0.208, z=0.243, and w=0.000 were obtained.

The results of B/A of the cross section of the secondary particle of the positive-electrode active material 3 for a lithium secondary battery, the presence or absence of through-holes, the void fraction of the entire cross section of the particle, the void fraction of the center portion of the particle/the void fraction of the entire particle, the void fraction of the center portion of the particle, the void fraction of the surface of the particle, pore diameter, BET specific surface area, discharge rate characteristics, and tap density are described in Table 1.

Example 4

Manufacturing of Positive-Electrode Active Material 4 for Lithium Secondary Battery

[Step of Manufacturing Nickel Cobalt Manganese Composite Hydroxide]

After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.51:0.22:0.27, whereby a mixed raw material solution was prepared.

Next, the mixed raw material solution and an aqueous solution of ammonium sulfate as a complexing agent were continuously added into the reaction tank under stirring, and an oxygen-containing gas obtained by mixing air in nitrogen gas was continuously flowed so as to cause the oxygen concentration to be 19%. Each solution was supplied so that the ratio of the weight of nickel, cobalt, and manganese as metal to the weight of sodium hydroxide became 0.90, and continuously stirred at 50° C., whereby nickel cobalt manganese composite hydroxide particles were obtained. The obtained nickel cobalt manganese composite hydroxide particles were washed with a sodium hydroxide solution, then dehydrated with a centrifugal separator, isolated, and dried at 105° C., whereby a nickel cobalt manganese composite hydroxide 4 was obtained.

[Mixing Step]

The nickel cobalt manganese composite hydroxide 4 obtained as described above and lithium carbonate powder were weighed and mixed so that Li/(Ni+Co+Mn)=1.07 (molar ratio).

[Calcining Step]

Thereafter, the mixture obtained in the above mixing step was heated in an oxygen atmosphere at 213° C./hr and calcined at 930° C. for 5.6 hours, whereby a positive-electrode active material 4 for a lithium secondary battery containing the secondary particles of the lithium composite metal oxide was obtained.

Evaluation of Positive-Electrode Active Material 4 for Lithium Secondary Battery Compositional analysis of the lithium composite metal oxide of the obtained positive-electrode active material 4 for a lithium secondary battery was performed, and when the composition was made to correspond to Composition Formula (I), $x=0.032$, $y=0.223$, $z=0.265$, and $w=0.000$ were obtained.

The results of B/A of the cross section of the secondary particle of the positive-electrode active material 4 for a lithium secondary battery, the presence or absence of through-holes, the void fraction of the entire cross section of the particle, the void fraction of the center portion of the particle/the void fraction of the entire particle, the void fraction of the center portion of the particle, the void fraction of the surface of the particle, pore diameter, BET specific surface area, discharge rate characteristics, and tap density are described in Table 1.

Example 5

Manufacturing of Positive-Electrode Active Material 5 for Lithium Secondary Battery

[Step of Manufacturing Nickel Cobalt Manganese Composite Hydroxide]

After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.55:0.21:0.24, whereby a mixed raw material solution was prepared.

Next, the mixed raw material solution and an aqueous solution of ammonium sulfate as a complexing agent were continuously added into the reaction tank under stirring, and an oxygen-containing gas obtained by mixing air in nitrogen gas was continuously flowed so as to cause the oxygen concentration to be 7.0%. Each solution was supplied so that the ratio of the weight of nickel, cobalt, and manganese as metal to the weight of sodium hydroxide became 0.94, and continuously stirred at 50° C., whereby nickel cobalt manganese composite hydroxide particles were obtained. The nickel cobalt manganese composite hydroxide particles were washed with a sodium hydroxide solution, then dehydrated with a centrifugal separator, isolated, and dried at 105° C., whereby a nickel cobalt manganese composite hydroxide 5 was obtained.

[Mixing Step]

The nickel cobalt manganese composite hydroxide 5 obtained as described above and lithium carbonate powder were weighed and mixed so that Li/(Ni+Co+Mn)=1.07 (molar ratio).

[Calcining Step]

Thereafter, the mixture obtained in the above mixing step was heated in an oxygen atmosphere at 200° C./hr and calcined at 875° C. for 10 hours, whereby a positive-electrode active material 5 for a lithium secondary battery containing the secondary particles of the lithium composite metal oxide was obtained.

Evaluation of Positive-Electrode Active Material 5 for Lithium Secondary Battery Compositional analysis of the lithium composite metal oxide of the obtained positive-electrode active material 5 for a lithium secondary battery was performed, and when the composition was made to correspond to Composition Formula (I), $x=0.036$, $y=0.210$, $z=0.238$, and $w=0.000$ were obtained.

The results of B/A of the cross section of the secondary particle of the positive-electrode active material 5 for a lithium secondary battery, the presence or absence of through-holes, the void fraction of the entire cross section of the particle, the void fraction of the center portion of the particle/the void fraction of the entire particle, the void fraction of the center portion of the particle, the void fraction of the surface of the particle, pore diameter, BET specific surface area, discharge rate characteristics, and tap density are described in Table 1.

Example 6

Manufacturing of Positive-Electrode Active Material 6 for Lithium Secondary Battery

[Step of Manufacturing Nickel Cobalt Manganese Composite Hydroxide]

After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.55:0.21:0.24, whereby a mixed raw material solution was prepared.

Next, the mixed raw material solution and an aqueous solution of ammonium sulfate as a complexing agent were continuously added into the reaction tank under stirring, and an oxygen-containing gas obtained by mixing air in nitrogen gas was continuously flowed so as to cause the oxygen concentration to be 7.0%. Each solution was supplied so that the ratio of the weight of nickel, cobalt, and manganese as metal to the weight of sodium hydroxide became 0.94, and continuously stirred at 50° C., whereby nickel cobalt manganese composite hydroxide particles were obtained. The nickel cobalt manganese composite hydroxide particles were washed with a sodium hydroxide solution, then dehydrated with a centrifugal separator, isolated, and dried at 105° C., whereby a nickel cobalt manganese composite hydroxide 6 was obtained.

[Mixing Step]

The nickel cobalt manganese composite hydroxide 5 obtained as described above and lithium carbonate powder were weighed and mixed so that Li/(Ni+Co+Mn)=1.07 (molar ratio).

[Calcining Step]

Thereafter, the mixture obtained in the above mixing step was heated in an oxygen atmosphere at 200° C./hr and calcined at 900° C. for 10 hours, whereby a positive-electrode active material 6 for a lithium secondary battery containing the secondary particles of the lithium composite metal oxide was obtained.

Evaluation of Positive-Electrode Active Material 6 for Lithium Secondary Battery Compositional analysis of the lithium composite metal oxide of the obtained positive-electrode active material 6 for a lithium secondary battery was performed, and when the composition was made to correspond to Composition Formula (I), x=0.031, y=0.210, z=0.238, and w=0.000 were obtained.

The results of B/A of the cross section of the secondary particle of the positive-electrode active material 6 for a lithium secondary battery, the presence or absence of through-holes, the void fraction of the entire cross section of the particle, the void fraction of the center portion of the particle/the void fraction of the entire particle, the void fraction of the center portion of the particle, the void fraction of the surface of the particle, pore diameter, BET specific surface area, discharge rate characteristics, and tap density are described in Table 1.

Comparative Example 1

Manufacturing of Positive-Electrode Active Material C1 for Lithium Secondary Battery

[Step of Manufacturing Nickel Cobalt Manganese Composite Hydroxide]

After water was put in a reaction tank equipped with a stirrer and an overflow pipe, an aqueous solution of sodium hydroxide was added thereto, and the liquid was maintained at a temperature of 58° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.55:0.21:0.24, whereby a mixed raw material solution was prepared.

Next, the mixed raw material solution and an aqueous solution of ammonium sulfate as a complexing agent were continuously added into the reaction tank under stirring, and nitrogen gas was continuously flowed. Each solution was supplied so that the ratio of the weight of nickel, cobalt, and manganese as metal to the weight of sodium hydroxide became 0.93, and continuously stirred at 58° C., whereby nickel cobalt manganese composite hydroxide particles were obtained. The nickel cobalt manganese composite hydroxide particles were washed with a sodium hydroxide solution, then dehydrated with a centrifugal separator, isolated, and dried at 105° C., whereby a nickel cobalt manganese composite hydroxide C1 was obtained.

[Mixing Step]

The nickel cobalt manganese composite hydroxide C1 obtained as described above and lithium carbonate powder were weighed and mixed so that Li/(Ni+Co+Mn)=1.07 (molar ratio).

[Calcining Step]

Thereafter, the mixture obtained in the above mixing step was heated in an oxygen atmosphere at 125° C./hr and calcined at 875° C. for 10 hours, whereby a positive-electrode active material C1 for a lithium secondary battery containing the secondary particles of the lithium composite metal oxide was obtained.

Evaluation of Positive-Electrode Active Material C1 for Lithium Secondary Battery Compositional analysis of the lithium composite metal oxide of the obtained positive-electrode active material 1 for a lithium secondary battery was performed, and when the composition was made to correspond to Composition Formula (I), x=0.027, y=0.206, z=0.237, and w=0.000 were obtained.

The results of B/A of the cross section of the secondary particle of the positive-electrode active material C1 for a lithium secondary battery, the presence or absence of through-holes, the void fraction of the entire cross section of the particle, the void fraction of the center portion of the particle/the void fraction of the entire particle, the void fraction of the center portion of the particle, the void fraction of the surface of the particle, pore diameter, BET specific surface area, discharge rate characteristics, and tap density are described in Table 1.

Comparative Example 2

Manufacturing of Positive-Electrode Active Material C2 for Lithium Secondary Battery

[Step of Manufacturing Nickel Cobalt Manganese Composite Hydroxide]

After water was put in a reaction tank equipped with a stirrer and an overflow pipe, an aqueous solution of sodium hydroxide was added thereto, and the liquid was maintained at a temperature of 30° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.33:0.34:0.33, whereby a mixed raw material solution was prepared.

Next, the mixed raw material solution and an aqueous solution of ammonium sulfate as a complexing agent were continuously added into the reaction tank under stirring, and an oxygen-containing gas obtained by mixing air in nitrogen gas was continuously flowed so as to cause the oxygen concentration to be 2.6%. Each solution was supplied so that the ratio of the weight of nickel, cobalt, and manganese as metal to the weight of sodium hydroxide became 0.86, and continuously stirred at 30° C., whereby nickel cobalt manganese composite hydroxide particles were obtained. The nickel cobalt manganese composite hydroxide particles were washed with a sodium hydroxide solution, then dehydrated with a centrifugal separator, isolated, and dried at 105° C., whereby a nickel cobalt manganese composite hydroxide C2 was obtained.

[Mixing Step]

The nickel cobalt manganese composite hydroxide C2 obtained as described above and lithium carbonate powder were weighed and mixed so that Li/(Ni+Co+Mn)=1.03 (molar ratio).

[Calcining Step]

Thereafter, the mixture obtained in the above mixing step was heated in an oxygen atmosphere at 150° C./hr and calcined at 900° C. for 10 hours, whereby a positive-electrode active material C2 for a lithium secondary battery containing the secondary particles of the lithium composite metal oxide was obtained.

Evaluation of Positive-Electrode Active Material C2 for Lithium Secondary Battery Compositional analysis of the lithium composite metal oxide of the obtained positive-electrode active material C2 for a lithium secondary battery was performed, and when the composition was made to correspond to Composition Formula (I), x=0.015, y=0.326, z=0.338, and w=0.000 were obtained.

The results of B/A of the cross section of the secondary particle of the positive-electrode active material C2 for a lithium secondary battery, the presence or absence of through-holes, the void fraction of the entire cross section of the particle, the void fraction of the center portion of the particle/the void fraction of the entire particle, the void fraction of the center portion of the particle, the void fraction of the surface of the particle, pore diameter, BET specific surface area, discharge rate characteristics, and tap density are described in Table 1.

TABLE 1

| | | Composition of lithium composite metal oxide | | | | Through-hole | Void fraction of cross section of particle | | |
|---|---|---|---|---|---|---|---|---|---|
| | | | | | | | | Void fraction of entire cross section of particle | Void area of center portion of particle/ void area of entire particle |
| | | x | y | z | w | | B/A | % | % |
| Example 1 | Positive-electrode active material 1 | 0.029 | 0.207 | 0.240 | 0.000 | Present | 0.94 | 4.4 | 97.3 |
| Example 2 | Positive-electrode active material 2 | 0.028 | 0.206 | 0.241 | 0.000 | Present | 0.90 | 8.4 | 92.6 |
| Example 3 | Positive-electrode active material 3 | 0.032 | 0.208 | 0.243 | 0.000 | Present | 0.85 | 6.6 | 96.2 |
| Example 4 | Positive-electrode active material 4 | 0.032 | 0.223 | 0.265 | 0.000 | Present | 0.85 | 11.4 | 81.9 |
| Example 5 | Positive-electrode active material 5 | 0.036 | 0.210 | 0.238 | 0.000 | Present | 0.79 | 10.6 | 82.7 |
| Example 6 | Positive-electrode active material 6 | 0.031 | 0.206 | 0.238 | 0.000 | Present | 0.80 | 4.3 | 85.4 |

TABLE 1-continued

| | | | | | | | | | |
|---|---|---|---|---|---|---|---|---|---|
| Comparative Example 1 | Positive-electrode active material C1 | 0.027 | 0.206 | 0.237 | 0.000 | Absent | 0.93 | 0.7 | 94.2 |
| Comparative Example 2 | Positive-electrode active material C2 | 0.015 | 0.326 | 0.338 | 0.000 | Present | 0.72 | 5.1 | 58.4 |

| | Void fraction of cross section of particle | | | | | |
|---|---|---|---|---|---|---|
| | Void fraction of center portion of particle % | Void fraction of surface portion of particle % | Pore diameter nm | BET m²/g | 10 C/0.2 C capacity retention ratio % | Tap density g/cc |
| Example 1 | 21.8 | 0.13 | 37 | 0.92 | 77.4 | 1.53 |
| Example 2 | 35.3 | 0.80 | 71 | 1.2 | 77.2 | 1.30 |
| Example 3 | 32.1 | 0.39 | 37 | 1.0 | 76.1 | 1.46 |
| Example 4 | 32.9 | 2.80 | 134 | 0.82 | 76.4 | 1.48 |
| Example 5 | 41.2 | 2.32 | 56 | 1.00 | 72.4 | 1.47 |
| Example 6 | 15.1 | 0.67 | 46 | 0.85 | 71.8 | 1.63 |
| Comparative Example 1 | 2.4 | 0.05 | Non | 0.3 | 58.5 | 2.65 |
| Comparative Example 2 | 13.2 | 2.81 | 65 | 1.0 | 66.7 | 1.15 |

As described in Table 1 above, the positive-electrode active materials for a lithium secondary battery of Examples 1 to 6 had a capacity retention ratio higher than that of Comparative Example 1 by about 20% or more.

INDUSTRIAL APPLICABILITY

According to the present invention, it is possible to provide a positive-electrode active material for a lithium secondary battery excellent in rate characteristics, a positive electrode for a lithium secondary battery using the positive-electrode active material for a lithium secondary battery, and a lithium secondary battery.

REFERENCE SIGNS LIST

1: separator
2: positive electrode
3: negative electrode
4: electrode group
5: battery can
6: electrolytic solution
7: top insulator
8: sealing body
10: lithium secondary battery
21: positive electrode lead
31: negative electrode lead
34a: secondary particle
53: void

The invention claimed is:
1. A positive-electrode active material for a lithium secondary battery, comprising:
a secondary particle in which a plurality of primary particles of a lithium composite metal oxide are aggregated,
wherein the secondary particle has a void formed therein and a through-hole that connects the void to a surface of the secondary particle,
the positive-electrode active material for the lithium secondary battery satisfies all of (i) to (iii),
a first void fraction in a center portion of the secondary particle is calculated by Formula (I) and is 20% or more and 40% or less, the first void fraction=a first area of a void part present in the center portion of a cross section of the secondary particle/an area of the center portion of the cross section of the secondary particle×100     (I), the center portion is a portion surrounded by a circle having a radius of r calculated by Formula (II) in which S is an area of a figure surrounded by an outer edge of the cross section of the secondary particle, and a center of the circle is a center of mass of the figure, $r=(S/\pi)^{0.5}/2$     (II), a second void fraction in a surface portion of the secondary particle is calculated by Formula (III) and is 0.10% or more and 3% or less, the second void fraction=a second area of a void part present in a surface portion of a cross section of the secondary particle/an area of the surface portion of the cross section of the secondary particle×100     (III), the surface portion is a portion excluding a center portion in the figure, and
a composition formula of the lithium composite metal oxide is represented by Formula (IV),
(i) a ratio (B/A) of a minor axis length B of the figure to a major axis length A of the figure is 0.75 or more and 1.0 or less,
(ii) a proportion of a total area of the void exposed in the cross section of the secondary particle to an area of the figure is 2.0% or more and 20% or less, and
(iii) a proportion of an area of the void present in the center portion of the secondary particle among the void exposed in the cross section of the secondary particle to the total area of the void exposed in the cross section is 60% or more and 99% or less, where the major axis length is a longest diameter among diameters of the figure passing through a position of center of mass of the figure, and

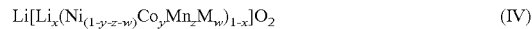   (IV)

wherein in Formula (IV), $0 \leq x \leq 0.2$, $0 < y \leq 0.4$, $0 \leq z \leq 0.4$, $0 \leq w \leq 0.1$, and M is one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

2. The positive-electrode active material for the lithium secondary battery according to claim 1,
wherein the positive-electrode active material has a pore peak at a pore radius of 30 nm or more and 150 nm or less in a pore distribution measurement by a mercury intrusion method.

3. The positive-electrode active material for the lithium secondary battery according to claim 1,
wherein a BET specific surface area of the secondary particles is 0.2 m²/g or more and 3.0 m²/g or less.

4. A positive electrode for the lithium secondary battery, comprising:
the positive-electrode active material for the lithium secondary battery according to claim 1.

5. A lithium secondary battery, comprising:
the positive electrode for the lithium secondary battery according to claim 4.

6. The positive-electrode active material for the lithium secondary battery according to claim 1,
wherein the Formula (IV) satisfies $0.15 \leq z \leq 0.4$.

\* \* \* \* \*